(12) United States Patent
Yang et al.

(10) Patent No.: US 12,501,407 B2
(45) Date of Patent: Dec. 16, 2025

(54) FULL DUPLEX SIDELINK FEEDBACK TRANSMISSIONS AND RECEPTIONS

(71) Applicant: QUALCOMM INCORPORATED, San Diego, CA (US)

(72) Inventors: Wei Yang, San Diego, CA (US); Seyedkianoush Hosseini, San Diego, CA (US); Alexandros Manolakos, Escondido, CA (US)

(73) Assignee: Qualcomm Incorporated, San Diego, CA (US)

( * ) Notice: Subject to any disclaimer, the term of this patent is extended or adjusted under 35 U.S.C. 154(b) by 216 days.

(21) Appl. No.: 18/262,464

(22) PCT Filed: Jan. 28, 2022

(86) PCT No.: PCT/US2022/014355
§ 371 (c)(1),
(2) Date: Jul. 21, 2023

(87) PCT Pub. No.: WO2022/211894
PCT Pub. Date: Oct. 6, 2022

(65) Prior Publication Data
US 2024/0089924 A1    Mar. 14, 2024

(30) Foreign Application Priority Data

Mar. 31, 2021 (GR) .............................. 20210100219

(51) Int. Cl.
*H04W 72/02* (2009.01)
*H04L 5/14* (2006.01)
(Continued)

(52) U.S. Cl.
CPC ............... *H04W 72/02* (2013.01); *H04L 5/14* (2013.01); *H04W 72/0453* (2013.01); *H04W 72/12* (2013.01); *H04W 72/563* (2023.01)

(58) Field of Classification Search
CPC . H04W 72/02; H04W 72/0453; H04W 72/12; H04W 72/40; H04W 72/563;
(Continued)

(56) References Cited

U.S. PATENT DOCUMENTS

2018/0234980 A1* 8/2018 Li ..................... H04W 74/0816
2020/0396718 A1 12/2020 Luo et al.
(Continued)

FOREIGN PATENT DOCUMENTS

WO  WO-2017213386 A1  12/2017
WO  WO-2021030561 A1  2/2021

OTHER PUBLICATIONS

International Search Report and Written Opinion—PCT/US2022/014355—ISA/EPO—May 6, 2022 (2102204WO).
(Continued)

Primary Examiner — Mohamed A Kamara
(74) Attorney, Agent, or Firm — Holland & Hart LLP

(57) ABSTRACT

Methods, systems, and devices for wireless communications are described. A user equipment (UE) may identify a first set of sidelink feedback messages to transmit and a second set of sidelink feedback messages to receive, the first set of sidelink feedback messages scheduled to be transmitted concurrently with the second set of sidelink feedback messages. The UE may select a first subset of sidelink feedback messages from the first set of sidelink feedback messages to transmit and a second subset of sidelink feedback messages from the second set of sidelink feedback messages to receive based at least in part on a priority level associated with each sidelink feedback message and a first set of frequency domain resources for the first subset of sidelink feedback messages and a second set of frequency domain resources for the second subset of sidelink feedback messages.

30 Claims, 12 Drawing Sheets

(51) Int. Cl.
*H04W 72/0453* (2023.01)
*H04W 72/12* (2023.01)
*H04W 72/563* (2023.01)

(58) Field of Classification Search
CPC ......... H04W 92/18; H04W 4/46; H04W 4/70; H04L 5/0055; H04L 5/14; H04L 2001/0092; H04L 1/1854; H04L 1/1892
See application file for complete search history.

(56) References Cited

U.S. PATENT DOCUMENTS

2021/0051660 A1* 2/2021 Askar ................ H04L 5/14
2021/0105728 A1* 4/2021 Nguyen .............. H04L 1/1854

OTHER PUBLICATIONS

LG Electronics: "Discussion on Physical Layer Procedures for NR Sidelink", 3GPP TSG RAN WG1 Meeting #99, 3GPP Draft, R1-1913237, 3rd Generation Partnership Project (3GPP), Mobile Competence Centre, 650, Route Des Lucioles, F-06921 Sophia-Antipolis Cedex, France, vol. RAN WG1, No. Reno, USA, Nov. 18-Nov. 22, 2019, Nov. 13, 2019 (Nov. 13, 2019), 20 Pages, XP051824916.

* cited by examiner

FULL DUPLEX SIDELINK FEEDBACK TRANSMISSIONS AND RECEPTIONS

CROSS REFERENCE

The present Application is a 371 national stage filing of International PCT Application No. 20210100219 by YANG et al. entitled "FULL DUPLEX SIDELINK FEEDBACK TRANSMISSIONS AND RECEPTIONS," filed Mar. 31, 2021; and claims priority to International Patent Application No. PCT/US2022/014355 by YANG et al. entitled "FULL DUPLEX SIDELINK FEEDBACK TRANSMISSIONS AND RECEPTIONS," filed Jan. 28, 2022, each of which is assigned to the assignee hereof, and each of which is expressly incorporated by reference in its entirety herein.

FIELD OF TECHNOLOGY

The following relates to wireless communications, including full duplex sidelink feedback transmissions and receptions.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support full duplex sidelink feedback transmissions and receptions. Generally, aspects of the described techniques provide for sidelink user equipment (UE) configuring a gap period between sidelink feedback resources (e.g., physical sidelink feedback channel (PSFCH) resources) to support full duplex PSFCH communications. For example, the sidelink UE may be performing sidelink communications with another sidelink UE (e.g., physical sidelink control channel (PSCCH) and/or physical sidelink shared channel (PSSCH) communications). This may include performing sidelink transmissions to the other sidelink UE as well as receiving sidelink transmissions from the other sidelink UE. Accordingly, this may result in one or more PSFCH feedback messages to be transmitted to the other sidelink UE (e.g., hybrid automatic repeat/request acknowledgement (HARQ-ACK) feedback messages based on receiving sidelink communications) and one or more PSFCH feedback messages to be received from the other sidelink UE (e.g., HARQ-ACK feedback messages based on transmitting sidelink communications). Accordingly, the sidelink UE may use the priority level of each PSFCH feedback in addition to the frequency domain resources associated with the PSFCH transmissions/receptions to map the PSFCH feedback to PSFCH transmit/receive resources. For example, the UE may determine the sets of PSFCH transmissions and receptions available for communications with the other sidelink UE. The UE may select (e.g., based on the priority level and the frequency domain resources) from the available PSFCH transmissions and receptions feedback a first subset of PSFCH transmissions and a second subset of PSFCH receptions to perform. The UE may perform the PSFCH feedback according to the selecting and using the frequency domain PSFCH resources.

A method for wireless communication at a UE is described. The method may include identifying a first set of sidelink feedback messages to transmit and a second set of sidelink feedback messages to receive, the first set of sidelink feedback messages scheduled to be transmitted concurrently with the second set of sidelink feedback messages and selecting a first subset of sidelink feedback messages from the first set of sidelink feedback messages to transmit and a second subset of sidelink feedback messages from the second set of sidelink feedback messages to receive based on a priority level associated with each sidelink feedback message and a first set of frequency domain resources for the first subset of sidelink feedback messages and a second set of frequency domain resources for the second subset of sidelink feedback messages.

An apparatus for wireless communication at a UE is described. The apparatus may include a processor, memory coupled with the processor, and instructions stored in the memory. The instructions may be executable by the processor to cause the apparatus to identify a first set of sidelink feedback messages to transmit and a second set of sidelink feedback messages to receive, the first set of sidelink feedback messages scheduled to be transmitted concurrently with the second set of sidelink feedback messages and select a first subset of sidelink feedback messages from the first set of sidelink feedback messages to transmit and a second subset of sidelink feedback messages from the second set of sidelink feedback messages to receive based on a priority level associated with each sidelink feedback message and a first set of frequency domain resources for the first subset of sidelink feedback messages and a second set of frequency domain resources for the second subset of sidelink feedback messages.

Another apparatus for wireless communication at a UE is described. The apparatus may include means for identifying a first set of sidelink feedback messages to transmit and a second set of sidelink feedback messages to receive, the first set of sidelink feedback messages scheduled to be transmitted concurrently with the second set of sidelink feedback messages and means for selecting a first subset of sidelink feedback messages from the first set of sidelink feedback messages to transmit and a second subset of sidelink feedback messages from the second set of sidelink feedback messages to receive based on a priority level associated with each sidelink feedback message and a first set of frequency domain resources for the first subset of sidelink feedback messages and a second set of frequency domain resources for the second subset of sidelink feedback messages.

A non-transitory computer-readable medium storing code for wireless communication at a UE is described. The code may include instructions executable by a processor to identify a first set of sidelink feedback messages to transmit and a second set of sidelink feedback messages to receive, the first set of sidelink feedback messages scheduled to be transmitted concurrently with the second set of sidelink feedback messages and select a first subset of sidelink feedback messages from the first set of sidelink feedback messages to transmit and a second subset of sidelink feedback messages from the second set of sidelink feedback messages to receive based on a priority level associated with each sidelink feedback message and a first set of frequency domain resources for the first subset of sidelink feedback messages and a second set of frequency domain resources for the second subset of sidelink feedback messages.

Some examples of the method, apparatuses, and non-transitory computer-readable medium described herein may further include operations, features, means, or instructions for mapping the first set of sidelink feedback messages to the first set of frequency domain resources and the second set of sidelink feedback messages to a second subset of frequency domain resources based on the priority level of each sidelink feedback message and a set of gap frequency resources configured between the first set of frequency domain resources and the second set of frequency domain resources satisfying a gap threshold and transmitting, in accordance with the mapping, the first subset of sidelink feedback messages using the first set of frequency domain resources while concurrently receiving the second subset of sidelink feedback messages using the second set of frequency domain resources.

In some examples of the method, apparatuses, and non-transitory computer-readable medium described herein, ordering, using a highest-to-lowest priority level ordering, each sidelink feedback message in the first set of sidelink feedback messages and the second set of sidelink feedback messages according to the priority level associated with each sidelink feedback message, where the mapping may be based on the ordering.

In some examples of the method, apparatuses, and non-transitory computer-readable medium described herein, the mapping the first subset of sidelink feedback messages to the first set of frequency domain resources and the second subset of sidelink feedback messages to the second set of frequency domain resources may include operations, features, means, or instructions for identifying, according to the priority level associated with each sidelink feedback message, a sidelink feedback that at least partially overlaps with a previously mapped sidelink feedback message having a higher priority level and dropping the sidelink feedback message based on the at least partial overlap with the previously mapped sidelink feedback message having the higher priority level.

In some examples of the method, apparatuses, and non-transitory computer-readable medium described herein, the mapping the first subset of sidelink feedback messages to the first set of frequency domain resources and the second subset of sidelink feedback messages to the second set of frequency domain resources may include operations, features, means, or instructions for determining, according to the priority level associated with each sidelink feedback message, that no sidelink feedback message at least partially overlaps with a previously mapped sidelink feedback message having a higher priority level and including, according to the gap threshold, each sidelink feedback message in the first subset of sidelink feedback messages or the second subset of sidelink feedback messages.

Some examples of the method, apparatuses, and non-transitory computer-readable medium described herein may further include operations, features, means, or instructions for determining that a number of sidelink feedback messages in the first subset of sidelink feedback messages satisfy a maximum sidelink feedback message count associated with the UE, where the mapping may be based on the number of sidelink feedback messages satisfying the maximum sidelink feedback message count.

In some examples of the method, apparatuses, and non-transitory computer-readable medium described herein, the mapping the first subset of sidelink feedback messages to the first set of frequency domain resources and the second subset of sidelink feedback messages to the second set of frequency domain resources may include operations, features, means, or instructions for identifying a first sidelink feedback channel on a first resource and a second sidelink feedback channel on a second resource, where the set of gap frequency resources between the first resource and the second resource fails to satisfy the gap threshold, the first sidelink feedback channel having a different direction and a lower priority level than the second sidelink feedback channel and dropping the first sidelink feedback channel based on the failing to satisfy the gap threshold and the priority level.

Some examples of the method, apparatuses, and non-transitory computer-readable medium described herein may further include operations, features, means, or instructions for determining that each sidelink feedback message in the first subset of sidelink feedback messages and the second subset of sidelink feedback messages may be non-overlapping with one or more instances of a set of gap frequency resources, where transmitting the first subset of sidelink feedback messages while concurrently receiving the second subset of sidelink feedback messages may be based on the non-overlapping.

In some examples of the method, apparatuses, and non-transitory computer-readable medium described herein, the set of gap frequency resources may be not configured between two or more instances of the first subset of sidelink feedback messages or between two or more instances of the second subset of sidelink feedback messages.

Some examples of the method, apparatuses, and non-transitory computer-readable medium described herein may further include operations, features, means, or instructions for determining that a sidelink feedback message reception in the second set of sidelink feedback messages may be in between two sidelink feedback message transmissions in the second set of sidelink feedback messages, where transmitting the first subset of sidelink feedback messages while concurrently receiving the second subset of sidelink feedback messages further includes dropping at least one of the two sidelink feedback message transmissions based on the sidelink feedback message reception being in between the two sidelink feedback message transmissions and the priority level of each sidelink feedback message.

Some examples of the method, apparatuses, and non-transitory computer-readable medium described herein may further include operations, features, means, or instructions for determining that a sidelink feedback message reception in the second set of sidelink feedback messages may be in between two sidelink feedback message transmissions in the second set of sidelink feedback messages, where transmitting the first subset of sidelink feedback messages while concurrently receiving the second subset of sidelink feedback messages further includes dropping the sidelink feedback message reception based on the sidelink feedback message reception being in between the two sidelink feedback message transmissions and the priority level of each sidelink feedback message.

Some examples of the method, apparatuses, and non-transitory computer-readable medium described herein may further include operations, features, means, or instructions for transmitting the first subset of sidelink feedback messages while concurrently receiving the second subset of sidelink feedback messages may be performed while operating in a sub-band full duplex mode.

Some examples of the method, apparatuses, and non-transitory computer-readable medium described herein may further include operations, features, means, or instructions for identifying one or more sidelink feedback messages that were dropped from the first set of sidelink feedback messages, the second set of sidelink feedback messages, or both and scheduling the one or more sidelink feedback messages separately from transmitting the first subset of sidelink feedback messages using the first set of frequency domain resources while concurrently receiving the second subset of sidelink feedback messages using the second set of frequency domain resources.

DETAILED DESCRIPTION

Figure 1:
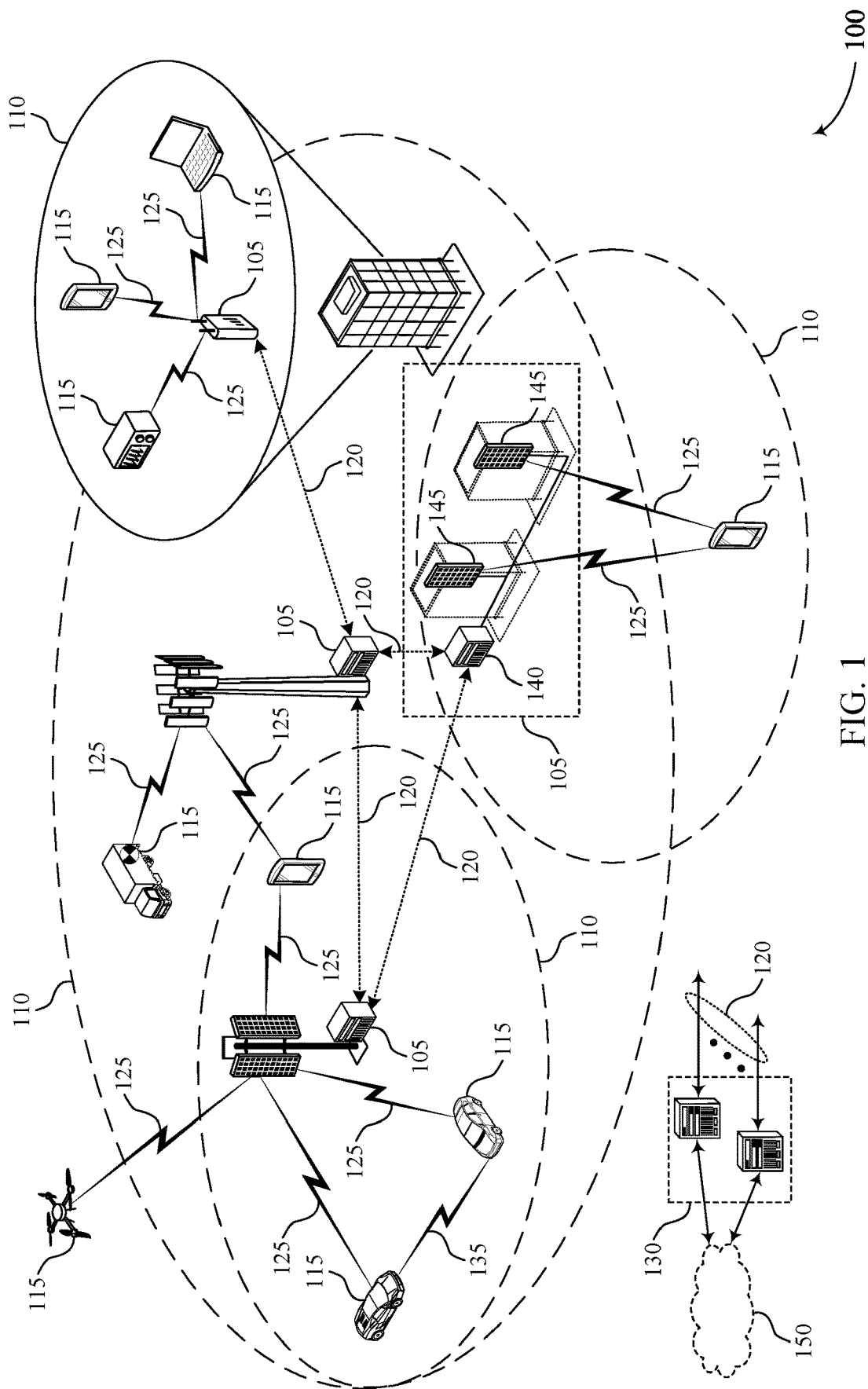
FIG. 1 illustrates an example of a wireless communications system that supports full duplex sidelink feedback transmissions and receptions in accordance with aspects of the present disclosure.

Some user equipment (UE) may utilize, or otherwise support, full duplex communications. This may include the UE transmitting wireless signal(s) on some resources while receiving wireless signal(s) on other resources at the same time (e.g., concurrently). In one use case, this may include a UE performing sidelink communications with other sidelink UE (e.g., UE-to-UE or inter-UE). For example, a sidelink UE may perform X sidelink feedback transmissions to the other sidelink UE (e.g., physical sidelink feedback channel (PSFCH) transmission) and receive Y sidelink feedback transmissions from the other sidelink UE (e.g., PSFCH reception). To support this, frequency gaps (e.g., guard resource blocks) may be configured between the sidelink PSFCH transmission resources and the sidelink PSFCH reception resources. Conventionally, such UE rely on the priority level associated with each PSFCH feedback transmission/reception to allocate the resources used for PSFCH communications. However, simply relying on the priority level for PSFCH signals may be inefficient and result in the sidelink UE dropping too many PSFCH transmissions/receptions. This may increase latency in such sidelink communications, as well as reduce reliability. For example, a dropped PSFCH transmission/reception may mean that the corresponding transmission associated with the PSFCH signal may be unnecessarily retransmitted between the sidelink UE.

Aspects of the disclosure are initially described in the context of wireless communications systems. Generally, aspects of the described techniques provide for sidelink UE configuring a gap period between sidelink feedback resources (e.g., PSFCH resources) to support full duplex PSFCH communications. For example, the sidelink UE may be performing sidelink communications with another sidelink UE (e.g., physical sidelink control channel (PSCCH) and/or physical sidelink shared channel (PSSCH) communications). This may include performing sidelink transmissions to the other sidelink UE as well as receiving sidelink transmissions from the other sidelink UE. Accordingly, this may result in one or more PSFCH feedback messages to be transmitted to the other sidelink UE (e.g., hybrid automatic repeat/request acknowledgement (HARQ-ACK) feedback messages based on receiving sidelink communications) and one or more PSFCH feedback messages to be received from the other sidelink UE (e.g., HARQ-ACK feedback messages based on transmitting sidelink communications). Accordingly, the sidelink UE may use the priority level of each PSFCH feedback in addition to the frequency domain resources associated with the PSFCH transmissions/receptions to map the PSFCH feedback to PSFCH transmit/receive resources. For example, the UE may determine the sets of PSFCH transmissions and receptions available for communications with the other sidelink UE. The UE may select (e.g., based on the priority level and the frequency domain resources) from the available PSFCH transmissions and receptions feedback a first subset of PSFCH transmissions and a second subset of PSFCH receptions to perform. The UE may perform the PSFCH feedback according to the selecting and using the frequency domain PSFCH resources.

Aspects of the disclosure are further illustrated by and described with reference to apparatus diagrams, system diagrams, and flowcharts that relate to full duplex sidelink feedback transmissions and receptions.

FIG. 1 illustrates an example of a wireless communications system 100 that supports full duplex sidelink feedback transmissions and receptions in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing (Δf) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A UE 115 (e.g., a sidelink UE) may identify a first set of sidelink feedback messages to transmit and a second set of sidelink feedback messages to receive, the first set of sidelink feedback messages scheduled to be transmitted concurrently with the second set of sidelink feedback messages. The UE 115 may select a first subset of sidelink feedback messages from the first set of sidelink feedback messages to transmit and a second subset of sidelink feedback messages from the second set of sidelink feedback messages to receive based at least in part on a priority level associated with each sidelink feedback message and a first set of frequency domain resources for the first subset of sidelink feedback messages and a second set of frequency domain resources for the second subset of sidelink feedback messages.

Figure 2:
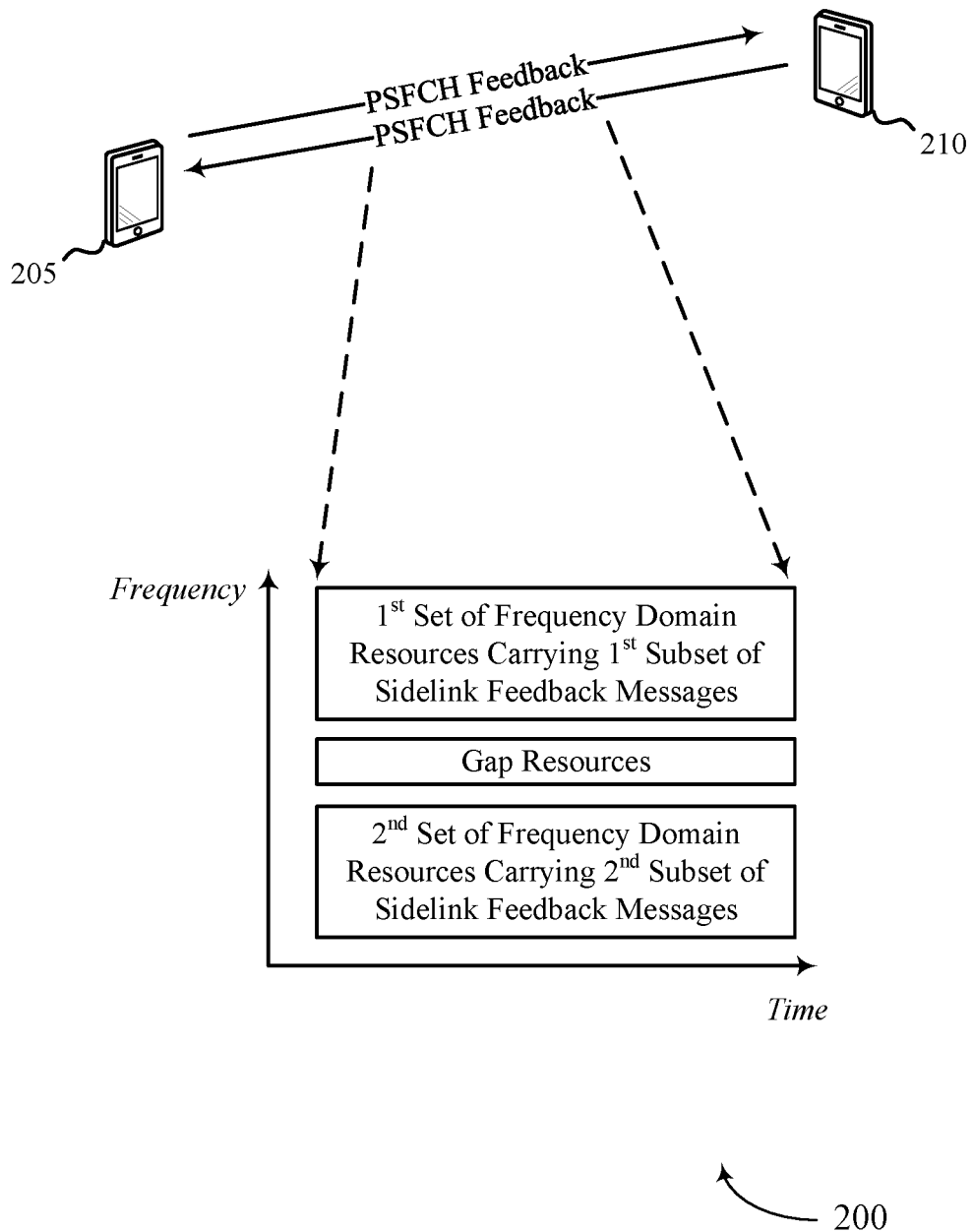
FIG. 2 illustrates an example of a wireless communications system that supports full duplex sidelink feedback transmissions and receptions in accordance with aspects of the present disclosure.

FIG. 2 illustrates an example of a wireless communications system 200 that supports full duplex sidelink feedback transmissions and receptions in accordance with aspects of the present disclosure. Wireless communications system 200 may implement aspects of wireless communications system 100. Wireless communications system 200 may include UE 205 and UE 210, which may be examples of the corresponding devices described herein. In some aspects, UE 205 and UE 210 may be configured as, or otherwise support, sidelink UE performing sidelink communications over various sidelink channels.

UE 205 and/or UE 210 may support sidelink feedback (e.g., HARQ-ACK feedback) for sidelink communications. The sidelink feedback may generally refer to HARQ-ACK feedback (e.g., ACK/NACK feedback) being transmitted over a sidelink feedback channel (e.g., PSFCH) for one or more sidelink communications (e.g., PSCCH and/or PSSCH communications). The nature of the sidelink feedback may depend on the direction of the sidelink feedback. For example, a sidelink feedback message may be transmitted from UE 205 to UE 210 indicating HARQ-ACK information for sidelink communications received from UE 210, or vice versa. A sidelink feedback message may be received by UE 205 from UE 210 indicating HARQ-ACK information for sidelink communications transmitted to UE 210, or vice versa. In some examples, each sidelink feedback message may use one bit to convey the ACK/NACK information, although the described techniques are not limited to such one bit PSFCH design considerations.

In some examples, a sidelink UE may need to transmit and receive sidelink feedback at the same time and/or may have a number of sidelink feedback messages for transmission above its capability. In this situation, the sidelink UE (e.g., UE 205 and/or UE 210) may generally prioritize the sidelink feedback transmissions/receptions of PSFCH based on the priority level of each sidelink feedback message (e.g., based on a priority field value associated with each PSFCH).

In some examples, the sidelink UE may be configured, or otherwise support, full duplex communications where the UE is able to perform transmission(s) to another sidelink UE while concurrently receiving transmissions from other sidelink UE. For example, the sidelink UE may be operating in a sub-band full duplex (SBFD) mode to improve throughput. Full duplex communications may provide, at least to some degree, double the bandwidth/throughput by allowing the base station/UE to transmit and receive on the same set of resources (e.g., the same time resources). Due to full duplex complications (e.g., self-interference between transmission and reception, inter-UE interference, etc.) and additional implementation complexities, SBFD may be considered as a first step to realize at least some of the benefits of full duplex communications, while circumventing some of its complications. For example, with SBFD communications with some gaps (e.g., gap resources) budgeted across downlink and uplink resources, self-interference control may be improved. At the same time, this may allow a device to transmit and receive at the same time in the same band (albeit on different/non-overlapping resources). Accordingly, for cellular communications, an SBFD slot may be partitioned into uplink and downlink portions with gaps in between. For sidelink communications, the resources in a slot may consist of transmit and receive portions, with the gaps in between.

For example, resource pools may be configured with PSFCH resources. The sidelink feedback (e.g., HARQ) may be sequence based (e.g., carrying a single bit per PSCCH/PSSCH) and may be sent on two consecutive symbols (e.g., symbols 11 and 12) of a slot. Typically, one symbol in the time domain is configured before and after the PSFCH resources (e.g., gap symbols). The gaps in the time domain may provide for retuning from transmit-to-receive or from receive-to-transmit configurations by the sidelink UE. In some examples, the gap symbol before the PSFCH symbol may be used for automatic gain control (AGC). The PSFCH resources may be configured using periodPSFCHresource that indicates the PSFCH periodicity, in the number of slots, in the resource pool The periodPSFCHresource value may be set to {0,1,2,4}, with 0 indicating that the PSFCH transmissions from a UE in the resource pool are disabled. The sidelink UE typically transmits the PSFCH (e.g., the sidelink feedback) in the first slot that includes PSFCH resources and is at least a number of slots (e.g., provided by MinTimeGapPSFCH) of the resource pool after a last slot of the PSCCH/PSSCH reception.

For example, the parameter rbSetPSFCH may indicate a set of $M_{PRB,set}^{PSFCH}$ PRBs in the resource pool that are used for PSFCH transmissions. The parameter numSubchannel may indicate the number of $N_{subch}$ subch subchannels for the resource pool. The parameter $N_{PSSCH}^{PSFCH}$ may indicate the number of PSSCH slots that are associated with a PSFCH slot, which may be determined using the parameter periodPSFCHresource. The parameter $M_{PRB,set}^{PSFCH}$ may be=α, $N_{subch} \times N_{PSSCH}^{PSFCH}$ and the parameter $M_{subch,slot}^{PSFCH}$ may $$be = \frac{M_{PRB,set}^{PSFCH}}{N_{subch} \times N_{PSSCH}^{PSFCH}}.$$

Accordingly, PSFCH resource determination by a sidelink UE in some situations may include the UE allocating the $[(i+j.N_{PSSCH}^{PSFCH}).M_{subch,slot}^{PSFCH},(i+1+j.$ $qkN_{PSSCH}^{PSFCH}).M_{PRB,set}^{PSFCH}-1]$PRBs from $J_{PRB,set}^{PSFCH}$ PRBs to slot I and sub-channel j, where $0 \leq i \leq N_{PSSCH}^{PSFCH}$ and $0 \leq j \leq N_{subch}$.

One non-limiting example of this configuration may include the PSFCH periodicity $M_{PSSCH}^{PSFCH}$ being equal to four, the number of sub-channels of the resource pool $N_{subch}$ being equal to ten, and $$M_{subch,Slot}^{PSFCH} = \frac{80}{4*10} = 2 \to 80 \, PRBs$$

being used for PSFCH. In some aspects, each sub-channel may be associated with two PSFCH PRBs, although PSFCH may only be transmitted on one of the PRBs. In this situation, the sidelink UE may select one of the two resources based on the source and the destination identifier (ID) (e.g., i=source ID+destination ID) mod 2.

As discussed, each sidelink feedback message may have an associated priority level (e.g., based on the associated priority field value) and the sidelink UE may generally use the priority level for PSFCH prioritizations. Typically, the prioritization rule for PSFCH transmissions/receptions may be: IF a UE (1) would transmit $N_{sch,Tx,PSFCH}$ PSFCH and receive $N_{sch,Rx,PSFCH}$ PSFCH, and (2) transmissions of $N_{sch,Tx,PSFCH}$ PSFCHs would overlap in time with receptions of the $N_{sch,Rx,PSFCH}$PSFCHs, THEN the UE transmits or receives only a set of PSFCHs corresponding to the smallest priority field value (e.g., the highest priority PSFCHs). This may be determined by a first set of sidelink control information (SCI) format 1-A and a second set of SCI format 1-A that are respectively associated with the $N_{sch,Tx,PSFCH}$ PSFCHs and the $N_{sch,Rx,PSFCH}$ PSFCHs. If the UE would transmit $N_{sch,Tx,PSFCH}$ PSFCHs in a PSFCH transmission occasion, the UE transmits $N_{Tx,PSFCH}$ PSFCHs corresponding to the smallest $N_{sch,Tx,PSFCH}$ priority field values (e.g., the highest priority PSFCHs) indicated in all SCI formats 1-A associated with the PSFCH transmission occasion.

Accordingly, a SBFD UE (e.g., UE 205 and/or UE 210) may be capable of transmitting and receiving at the same time, but the transmissions and receptions must be on different resources (e.g., different frequency resources), with gaps in between. In the situation where a UE is scheduled to transmit X PSFCHs and receive Y PSFCHs (e.g., with X and Y corresponding to the quantities of channels, such as transmit channels and/or receive channels, being scheduled), it may be less efficient to always drop all of the transmissions or receptions as is currently done.

Accordingly, aspects of the described techniques provide various mechanisms (e.g., new rule(s)) for the SBFD UEs to determine which PSFCHs to transmit/receive and which PSFCH(s) to drop, while at the same time meeting SBFD requirements. These techniques may include the sidelink UE not transmitting and receiving in the same resource block, may include the gap resources between a transmit portion and a receive portion. In some examples, there may only be one transmit segment.

For example, aspects of the described techniques may include the sidelink UE (e.g., UE 205 in this example, although UE 210 may also perform the same/similar actions) may select, determine, or otherwise identify a first set of sidelink feedback messages to transmit (e.g., PSFCH messages available for transmission) and a second set of sidelink feedback messages to receive (e.g., PSFCH messages expected to be received). Broadly, the first and second sets of sidelink feedback messages may be scheduled/available for transmission at the same time (e.g., concurrently). As discussed, each sidelink feedback message may be associated with a priority level (e.g., the priority field value, with a smaller priority field value corresponding to a higher priority level).

The sidelink UE may select a first subset of the sidelink feedback messages from the first set of sidelink feedback messages to transmit and a second subset of sidelink feedback messages from the second set of sidelink feedback messages to receive. In some aspects, this may be based on the priority level of each sidelink feedback message as well as the PSFCH frequency domain resources. For example, this may include a first set of frequency domain resources for the first subset of sidelink feedback messages and a second set of frequency domain resources for the second subset of sidelink feedback messages.

For example, a sidelink UE operating in a SBFD mode may be scheduled to transmit X PSFCHs (e.g., X sidelink feedback messages in the first set of sidelink feedback messages to transmit) and receive Y PSFCHs (e.g., Y sidelink feedback messages in the second set of sidelink feedback messages to receive) in the same frequency band/carrier. The sidelink UE may use the following pseudo code (e.g., procedure) to determine the subsets of PSFCHs to transmit and/or receive.

First, the sidelink UE may order the PSFCHs according to the priority field value among the priority field values indicated in the multiple SCI format 1-A that schedule the X+Y PSFCHs from high to low priority. This may include UE 205 (in this example) ordering, using the highest-to-lowest priority level ordering, each sidelink feedback message in the first and second sets of sidelink feedback messages according to the priority level of each sidelink feedback message.

Second, the sidelink UE may initialize the set S of valid PSFCHs (e.g., the available PSFCHs in the first and second sets of sidelink feedback messages) to $\emptyset$. For i=1 to X+Y, the sidelink UE may let $A_i$ be the resource block index of $PSFCH_i$, and denote $C_i = \{A_i - G, \ldots, A_i - 1, A_i, A_i + 1, \ldots, A_i + G\}$, where G denotes the number of resource blocks required as the gap between a transmission and reception at the same time by the UE. If $\exists PSFCH_j \in S$ such that $A_j \in C_i$ and $PSFCH_j$ is in a different direction from $PSFCH_i$ (e.g., if the transmission/reception of $PSFCH_i$, including the gap, collides with any previously determined reception/transmission of $PSFCH_j$), then $PSFCH_i$ is dropped. Else, if $PSFCH_i$ is a transmission, and the number of PSFCH transmissions in S is equal to the maximum number of PSFCHs that the UE can transmit at a given time, then $PSFCH_i$ is dropped. Otherwise, $S = S \cup PSFCH_i$ (e.g., the $PSFCH_i$ can be included in the subset of sidelink feedback messages that can be transmitted/received) can be transmitted/received (e.g., included in the subset of sidelink feedback messages). This may end the pseudo code (e.g., end the for loop) and all PSFCHs in the set S can be transmitted and received by the UE at the same time.

One non-limiting example of this may include the UE mapping the first set sidelink feedback messages to the first set of frequency domain resources (e.g., to identify the first subset of sidelink feedback messages) and the second set of sidelink feedback messages to the second set of frequency domain resources (e.g., to identify the second subset of sidelink feedback messages) based on the priority level of each sidelink feedback message. This may also be based on the set of gap frequency resources (e.g., the gap resources) configured between the first set and the second sets of frequency domain resources. If the sidelink UE identifies a sidelink feedback message that at least partially overlaps with a previously mapped sidelink feedback message having a higher priority level, the UE may drop the sidelink feedback message. That is, as the previously mapped sidelink feedback messages have a higher priority than the sidelink feedback message being considered, the lower priority sidelink feedback message may be dropped. If the sidelink UE determines that no sidelink feedback messages at least partially overlap with a previously mapped sidelink message having a higher priority level, the UE may include each sidelink feedback message in the appropriate subset of sidelink feedback messages. If the sidelink UE determines that the number of sidelink feedback messages in the first subset of sidelink feedback messages satisfy the maximum sidelink feedback message count of the sidelink UE (e.g., does not exceed the maximum PSFCH limit and/or SBFD capability of the UE), the UE may include each sidelink feedback message.

In some examples, such mapping may include the sidelink UE identifying or otherwise determining a first sidelink feedback channel on a first resource and a second sidelink feedback channel on a second resource. The first sidelink feedback channel may have a different direction (e.g., transmit or receive) than the second sidelink feedback channel, in addition to a lower priority level. If the set of gap frequency resources between the first and second resources fail to satisfy the gap threshold, the UE may drop the first sidelink feedback channel accordingly. That is, the sidelink feedback channel in this example may include whether the sidelink feedback message is for transmission (e.g., a Tx PSFCH channel) or for reception (e.g., a Rx PSFCH channel). Accordingly, if the sidelink UE determines that a PSFCH overlaps with the gap resources of a previously mapped PSFCH resource, the UE may drop those overlapping sidelink feedback message(s).

Accordingly, the sidelink UE may transmit the first subset of sidelink feedback messages using the first set of frequency domain resources while, at the same time, receiving the second subset of sidelink feedback messages using the second set of frequency domain resources. Such techniques may improve PSFCH transmission/reception selection based, not only on the priority level of each sidelink feedback message, on the frequency domain resources and gap frequency resources available/configured for the PSFCH HARQ-ACK. In the situation where sidelink feedback messages are dropped, the sidelink UE may schedule the dropped sidelink feedback message for subsequent transmission.

In some aspects, the set of gap frequency resources are configured between PSFCH transmissions and PSFCH receptions, but may not be configured between PSFCH transmissions or between PSFCH receptions.

Figure 3A:
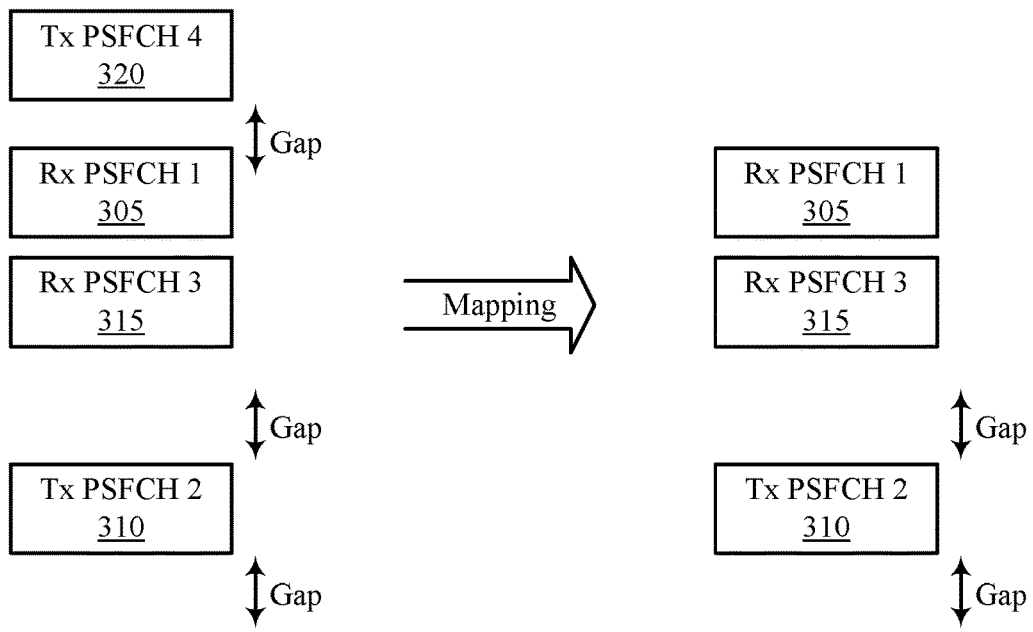
FIGS. 3A and 3B illustrate examples of a PSFCH configuration that supports full duplex sidelink feedback transmissions and receptions in accordance with aspects of the present disclosure.
Figure 3B:
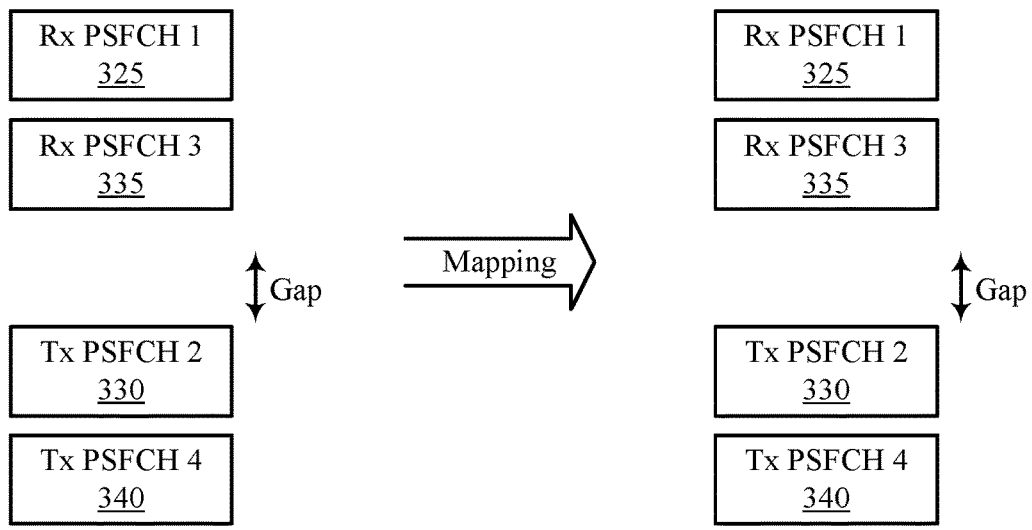

FIGS. 3A and 3B illustrate examples of a PSFCH configuration 300 that supports full duplex sidelink feedback transmissions and receptions in accordance with aspects of the present disclosure. PSFCH configuration 300 may implement, or may be implemented by, wireless communications systems 100 and/or 200. Aspects of PSFCH configuration 300 may be implemented by or at a UE, such as a sidelink UE as described herein.

As discussed above, aspects of the described techniques provides mechanisms for a SBFD UE to determine which PSFCHs to transmit/receive, and which PSFCHs to drop.

Such techniques may support (e.g., for the SBFD mode operations) the sidelink UE to not transmit and receive on the same resource block, provide for the gap resources between the transmit portion and receive portion, and/or may provide for only one transmit portion (e.g., in some examples).

For example, the sidelink UE may select, determine, or otherwise identify a first set of sidelink feedback messages to transmit and a second set of sidelink feedback messages to receive. Generally, the first set of sidelink feedback messages to transmit may include all PSFCHs that are available to be transmitted by the sidelink UE in response to sidelink transmission(s) received from other sidelink UE(s) (e.g., HARQ-ACK feedback for PSCCH and/or PSSCH transmissions received from the other UE(s)). Similarly, the second set of sidelink feedback messages to receive may include all PSFCHs that are available to be received from other sidelink UE(s) in response to sidelink transmission(s) to the other sidelink UE(s). Each sidelink feedback message in the first and second sets of sidelink feedback messages may have a corresponding priority level.

The sidelink UE may select a first subset of sidelink feedback messages from the first set of sidelink feedback messages in addition to a second subset of sidelink feedback messages from the second set of sidelink feedback messages. In some aspects, this selection may be based on the priority level associated with each sidelink feedback message. This selection may be based on a first set of frequency domain resources for the first subset of sidelink feedback messages and a second set of frequency domain resources for the second subset of sidelink feedback messages. This may include the sidelink UE mapping the first set of sidelink feedback messages to the first set of frequency domain resources and the second set of sidelink feedback messages to the second set of frequency domain resources based on the priority level of each sidelink feedback message. This mapping may be based on the set of gap frequency resources configured between the first set of frequency domain resources and the second set of frequency domain resources satisfying a gap threshold. Accordingly, the sidelink UE may transmit the first subset of sidelink feedback messages using the first set of frequency domain resources while concurrently (e.g., at the same time, since the sidelink UE is operating in the SBFD mode) receiving the second subset of sidelink feedback messages using the second set of frequency domain resources.

Turning first to PSFCH configuration 300-a of FIG. 3A, this may include the first set of sidelink feedback messages including PSFCH 310 and PSFCH 320. PSFCH 310 and PSFCH 320 are both sidelink feedback messages available to transmit. The priority level of PSFCH 310 is 2 and the priority level for PSFCH 320 is 4. This may include the second set of sidelink feedback messages including PSFCH 305 and PSFCH 315. PSFCH 305 and PSFCH 315 are both sidelink feedback messages available to receive. The priority level of PSFCH 305 is 1 and the priority level for PSFCH 315 is 3. Accordingly, ordering the sidelink feedback messages in a highest-to-lowest priority level ordering may include PSFCH 305 being ordered first (e.g., having the highest priority level), PSFCH 310 being ordered second (e.g., having the next highest priority level), PSFCH 315 being ordered third (e.g., having the second highest priority level), and PSFCH 320 being ordered last (e.g., having the lowest priority level).

As illustrated in FIG. 3A, the sidelink UE may select, according to the described techniques, a first subset of sidelink feedback messages from the first set of sidelink feedback messages to transmit and a second subset of sidelink feedback messages from the second set of sidelink feedback messages to receive. The selection may be based, at least in some aspects, on the priority level associated with each sidelink feedback message. The selection may be based, at least in some aspects, on the first set of frequency domain resources for the first subset of sidelink feedback messages and the second set of frequency domain resources for the second subset of sidelink feedback messages. The sidelink UE may map the first subset of sidelink feedback messages to the first set of frequency domain resources and the second subset of sidelink feedback messages to the second set of frequency domain resources. The mapping may be based on the set of gap frequency resources (e.g., at least one, but possibly more than one, resource block) between the first set and second set of frequency domain resources. In the non-limiting example illustrated in FIG. 3A, this may include the sidelink UE mapping PSFCH 305 and PSFCH 315 to the second set of frequency domain resources and mapping PSFCH 310 to the first set of frequency domain resources. Since PSFCH 320 is the lowest priority level sidelink feedback message and is configured in frequency domain resources that do not satisfy the gap threshold, the sidelink UE may drop PSFCH 320 (e.g., in order to ensure that the higher priority PSFCH 305 is included, but without interfering with gap resources). That is, if the sidelink UE were to map PSFCH 320 for transmission, this may violate the gap threshold of gap frequency resources between the first and second sets of frequency domain resources.

Turning next to PSFCH configuration 300-b of FIG. 3B, this may include the first set of sidelink feedback messages including PSFCH 330 and PSFCH 340. PSFCH 330 and PSFCH 340 are both sidelink feedback messages available to transmit. The priority level of PSFCH 330 is 2 and the priority level for PSFCH 340 is 4. This may include the second set of sidelink feedback messages including PSFCH 325 and PSFCH 325. PSFCH 325 and PSFCH 335 are both sidelink feedback messages available to receive. The priority level of PSFCH 325 is 1 and the priority level for PSFCH 335 is 3. Accordingly, ordering the sidelink feedback messages in a highest-to-lowest priority level ordering may include PSFCH 325 being ordered first (e.g., having the highest priority level), PSFCH 330 being ordered second (e.g., having the next highest priority level), PSFCH 335 being ordered third (e.g., having the second highest priority level), and PSFCH 340 being ordered last (e.g., having the lowest priority level).

As illustrated in FIG. 3B, the sidelink UE may select, according to the described techniques, a first subset of sidelink feedback messages from the first set of sidelink feedback messages to transmit and a second subset of sidelink feedback messages from the second set of sidelink feedback messages to receive. The selection may be based, at least in some aspects, on the priority level associated with each sidelink feedback message. The selection may be based, at least in some aspects, on the first set of frequency domain resources for the first subset of sidelink feedback messages and the second set of frequency domain resources for the second subset of sidelink feedback messages. The sidelink UE may map the first subset of sidelink feedback messages to the first set of frequency domain resources and the second subset of sidelink feedback messages to the second set of frequency domain resources. The mapping may be based on the set of gap frequency resources (e.g., at least one, but possibly more than one, resource block) between the first set and second set of frequency domain resources. In the non-limiting example illustrated in FIG. 3B, this may include the sidelink UE mapping PSFCH 325 and PSFCH 335 to the second set of frequency domain resources and mapping PSFCH 330 and PSFCH 340 to the first set of frequency domain resources. Since none of the sidelink feedback messages (e.g., PSFCH) are in frequency domain resources that do not overlap with the gap resources, all of the sidelink feedback messages are included for transmission/reception using the appropriate frequency domain resources. That is, in some aspects the set of gap resources (e.g., the frequency gap) may be included between transmit and receive portions based on the different in channel directions. In the situation where each portion is used for sidelink feedback message transmissions or for sidelink feedback message receptions, the set of gap frequency resources may not be needed and the portions may be treated as a single portion.

Figure 4A:
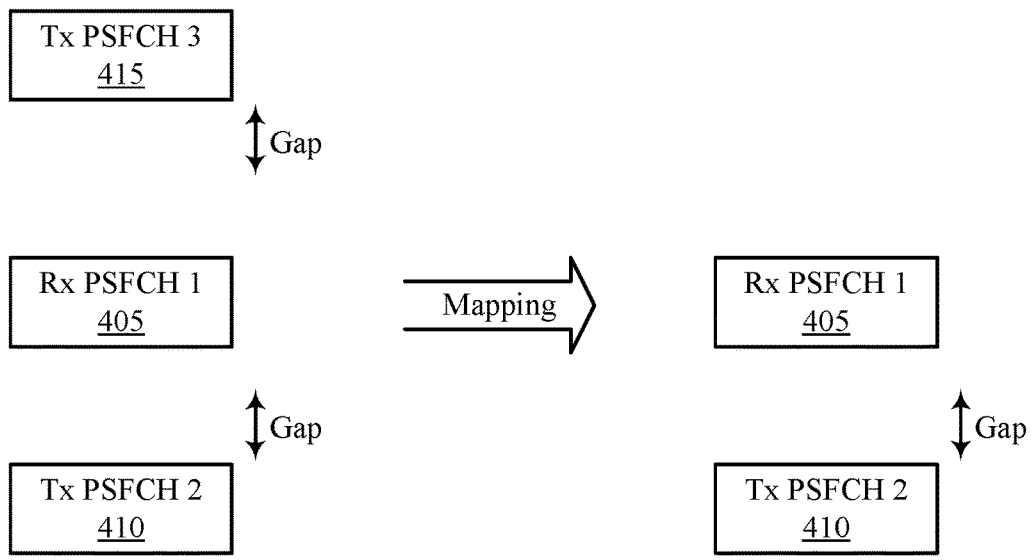
FIGS. 4A and 4B illustrate examples of a PSFCH configuration that supports full duplex sidelink feedback transmissions and receptions in accordance with aspects of the present disclosure.
Figure 4B:
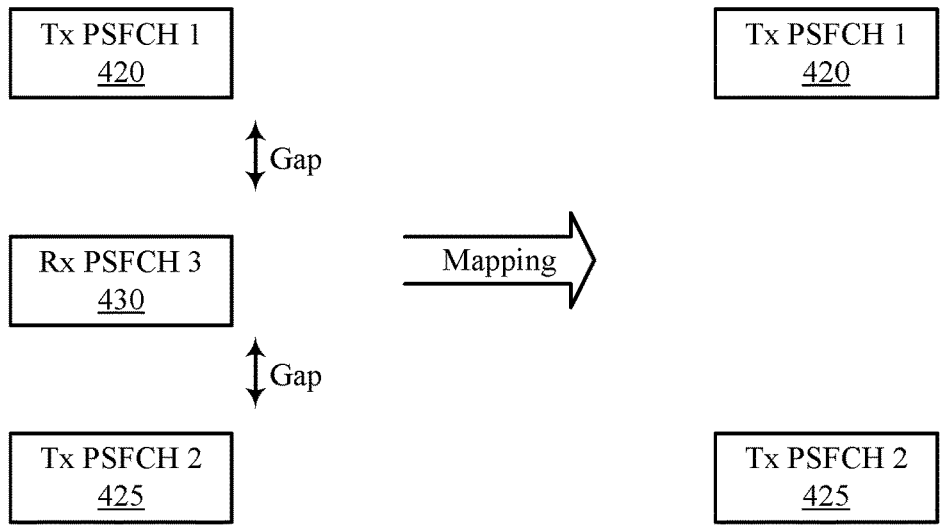

FIGS. 4A & 4B illustrates an example of a PSFCH configuration 400 that supports full duplex sidelink feedback transmissions and receptions in accordance with aspects of the present disclosure. PSFCH configuration 400 may implement, or may be implemented by, wireless communications systems 100 and/or 200 and/or PSFCH configuration 300. Aspects of PSFCH configuration 400 may be implemented by or at a UE, such as a sidelink UE as described herein.

As discussed above, aspects of the described techniques provides mechanisms for a SBFD UE to determine which PSFCHs to transmit/receive, and which PSFCHs to drop. Such techniques may support (e.g., for the SBFD mode operations) the sidelink UE to not transmit and receive on the same resource block, provide for the gap resources between the transmit portion and receive portion, and/or may provide for only one transmit portion (e.g., in some examples).

For example, the sidelink UE may select, determine, or otherwise identify a first set of sidelink feedback messages to transmit and a second set of sidelink feedback messages to receive. Generally, the first set of sidelink feedback messages to transmit may include all PSFCHs that are available to be transmitted by the sidelink UE in response to a sidelink transmission received from another sidelink UE (e.g., HARQ-ACK feedback for PSCCH and/or PSSCH transmissions). Similarly, the second set of sidelink feedback messages to receive may include all PSFCHs that are available to be received from another sidelink UE in response to a sidelink transmission to the other UE. Each sidelink feedback message in the first and second sets of sidelink feedback messages may have a corresponding priority level.

The sidelink UE may select a first subset of sidelink feedback messages from the first set of sidelink feedback messages in addition to a second subset of sidelink feedback messages from the second set of sidelink feedback messages. In some aspects, this selection may be based on the priority level associated with each sidelink feedback message. This selection may be based on a first set of frequency domain resources for the first subset of sidelink feedback messages and a second set of frequency domain resources for the second subset of sidelink feedback messages. This may include the sidelink UE mapping the first set of sidelink feedback messages to the first set of frequency domain resources and the second set of sidelink feedback messages to the second set of frequency domain resources based on the priority level of each sidelink feedback message. This mapping may be based on the set of gap frequency resources configured between the first set of frequency domain resources and the second set of frequency domain resources satisfying a gap threshold. Accordingly, the sidelink UE may transmit the first subset of sidelink feedback messages using the first set of frequency domain resources while concurrently (e.g., at the same time, since the sidelink UE is operating in the SBFD mode) receiving the second subset of sidelink feedback messages using the second set of frequency domain resources.

In some examples, the sidelink UE may restrict the sidelink feedback messages to a single transmit portion (e.g., no PSFCH reception is scheduled in between two PSFCH transmissions. For example, for a PSFCH transmission i, if there is a PSFCH$_j$ ∈S that is also a transmission, and if there is any PSFCH receptions in S that lie in between PSFCH$_i$ and PSFCH$_j$, then PSFCH$_i$ may dropped. That is, if the sidelink UE determines that a sidelink feedback message reception in the second set of sidelink feedback messages is in between two sidelink feedback message transmissions in the first set of sidelink feedback messages, transmitting the first subset of sidelink feedback messages while concurrently receiving the second subset of sidelink feedback messages further may include the UE dropping at least one of the two sidelink feedback message transmissions based at least in part on the sidelink feedback message reception being in between the two sidelink feedback message transmissions and the priority level of each sidelink feedback message. In another example, for a PSFCH reception i, if the reception lies in between two PSFCH transmissions that are contained in S, then PSFCH reception i may be dropped. Such differences in these examples may be based on the priority level of each PSFCH transmission and PSFCH reception involved, which results in different transmission/reception determinations.

Turning first to PSFCH configuration 400-a of FIG. 4A, this may include the first set of sidelink feedback messages including PSFCH 410 and PSFCH 415. PSFCH 410 and PSFCH 415 are both sidelink feedback messages available to transmit. The priority level of PSFCH 410 is 2 and the priority level for PSFCH 415 is 3. This may include the second set of sidelink feedback messages including PSFCH 405. PSFCH 405 is a sidelink feedback message available to receive. The priority level of PSFCH 405 is 1. Accordingly, ordering the sidelink feedback messages in a highest-to-lowest priority level ordering may include PSFCH 405 being ordered first (e.g., having the highest priority level), PSFCH 410 being ordered second (e.g., having the next highest priority level), and PSFCH 415 being ordered last (e.g., having the lowest priority level).

As illustrated in FIG. 4A, the sidelink UE may select, according to the described techniques, a first subset of sidelink feedback messages from the first set of sidelink feedback messages to transmit and a second subset of sidelink feedback messages from the second set of sidelink feedback messages to receive. The selection may be based, at least in some aspects, on the priority level associated with each sidelink feedback message. The selection may be based, at least in some aspects, on the first set of frequency domain resources for the first subset of sidelink feedback messages and the second set of frequency domain resources for the second subset of sidelink feedback messages. The sidelink UE may map the first subset of sidelink feedback messages to the first set of frequency domain resources and the second subset of sidelink feedback messages to the second set of frequency domain resources. The mapping may be based on the set of gap frequency resources (e.g., at least one, but possibly more than one, resource block) between the first set and second set of frequency domain resources. However, in the non-limiting example illustrated in FIG. 4A, this may include the sidelink UE mapping PSFCH 405 to the second set of frequency domain resources and mapping PSFCH 410 to the first set of frequency domain resources. That is, since the rule that only one transmit portion is applied and since PSFCH 405 is in between PSFCH 410 and PSFCH 415 and because PSFCH 405 has a higher priority level than PSFCH 405, the sidelink UE may drop PSFCH 415.

Turning next to PSFCH configuration 400-*b* of FIG. 4B, this may include the first set of sidelink feedback messages including PSFCH 420 and PSFCH 425. PSFCH 425 and PSFCH 425 are both sidelink feedback messages available to transmit. The priority level of PSFCH 420 is 1 and the priority level for PSFCH 425 is 2. This may include the second set of sidelink feedback messages including PSFCH 430. PSFCH 430 is a sidelink feedback message available to receive. The priority level of PSFCH 430 is 3. Accordingly, ordering the sidelink feedback messages in a highest-to-lowest priority level ordering may include PSFCH 420 being ordered first (e.g., having the highest priority level), PSFCH 425 being ordered second (e.g., having the next highest priority level), and PSFCH 430 being ordered last (e.g., having the lowest priority level).

As illustrated in FIG. 4B, the sidelink UE may select, according to the described techniques, a first subset of sidelink feedback messages from the first set of sidelink feedback messages to transmit and a second subset of sidelink feedback messages from the second set of sidelink feedback messages to receive. The selection may be based, at least in some aspects, on the priority level associated with each sidelink feedback message. The selection may be based, at least in some aspects, on the first set of frequency domain resources for the first subset of sidelink feedback messages and the second set of frequency domain resources for the second subset of sidelink feedback messages. The sidelink UE may map the first subset of sidelink feedback messages to the first set of frequency domain resources and the second subset of sidelink feedback messages to the second set of frequency domain resources. The mapping may be based on the set of gap frequency resources (e.g., at least one, but possibly more than one, resource block) between the first set and second set of frequency domain resources. In the non-limiting example illustrated in FIG. 4B, this may include the sidelink UE mapping PSFCH 420 and PSFCH 425 to the first set of frequency domain resources and not mapping PSFCH 430 to the second set of frequency domain resources. However, in the non-limiting example illustrated in FIG. 4B, this may include the sidelink UE mapping PSFCH 420 and PSFCH 425 to the first set of frequency domain resources and dropping PSFCH 430. That is, since the rule that only one transmit portion is applied and since PSFCH 430 is in between PSFCH 420 and PSFCH 425 and because PSFCH 430 has the lowest priority level, the sidelink UE may drop PSFCH 430.

That is, the sidelink UE may generally be limited to have only K transmit portions, with K being one or more. In this situation, the sidelink UE may apply the techniques described above to ensure that the first and second sets of sidelink feedback messages are determined, after the mapping of the set of available sidelink feedback resources, such that they contain less than or equal to K transmit portions. If adding a channel i (e.g., $PSFCH_i$ to the set of S transmit/receive PSFCHs results in more than K transmit portions (with at least K−1 PSFCH receptions interleaved between the K transmit portions), then the sidelink UE may drop the channel i.

Figure 5:
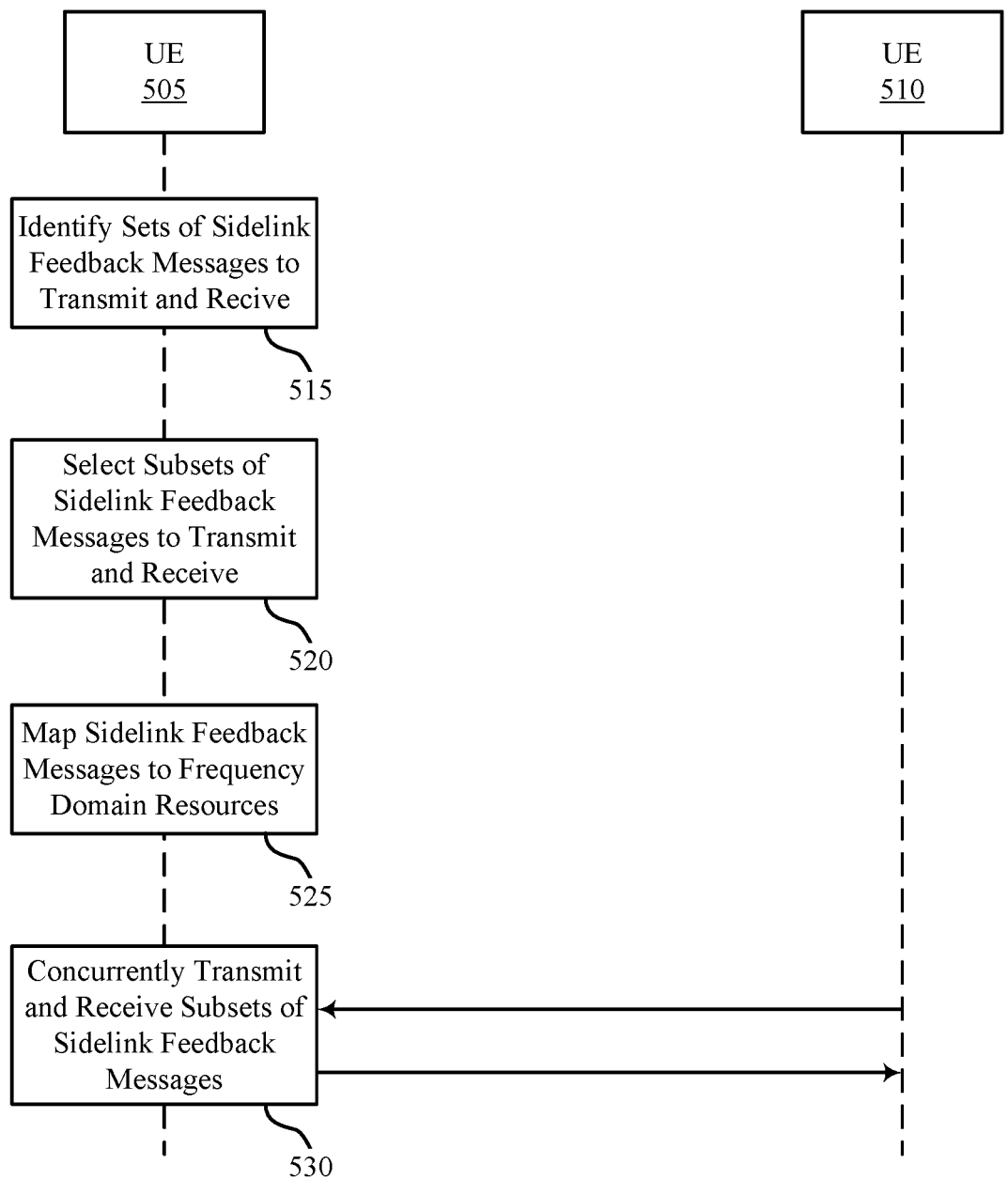
FIG. 5 illustrates an example of a process that supports full duplex sidelink feedback transmissions and receptions in accordance with aspects of the present disclosure.

FIG. 5 illustrates an example of a process 500 that supports full duplex sidelink feedback transmissions and receptions in accordance with aspects of the present disclosure. Aspects of process 500 may be implemented at or implemented by wireless communications systems 100 and/or 200, and/or PSFCH configurations 300 and/or 400. Aspects of process 500 may be implemented by or at UE 505 and/or UE 510, which may be examples of the corresponding devices described herein.

At 515, UE 505 may select, identify, or otherwise determine, a first set of sidelink feedback messages to transmit and a second set of sidelink feedback messages to receive. In some aspects, the first set of sidelink feedback messages may be scheduled for transmission concurrently with (e.g., at the same time using the same time domain resources) with the second set of sidelink feedback messages. Each sidelink feedback message may have, or otherwise be associated with, a corresponding priority level.

At 520, UE 505 may select a first subset of sidelink feedback messages from the first set of sidelink feedback messages to transmit. UE 505 may also select a second subset of sidelink feedback messages from the second set of sidelink feedback messages to receive. In some aspects, the selection may be based on the priority level associated with each sidelink feedback message. In some aspects, the selection may be based on a first set of frequency domain resources for the first subset of sidelink feedback messages and a second set of frequency domain resources for the second subset of sidelink feedback messages.

At 525, UE 505 may map the first subset of sidelink feedback messages to a first set of frequency domain resources and the second subset of sidelink feedback messages to a second set of frequency domain resources. In some aspects, this mapping may be based on the priority level of each sidelink feedback message. In some aspects, this mapping may be based on a set of gap frequency resources configured between the first set of frequency domain resources and the second set of frequency domain resources satisfying a gap threshold. For example, the gap threshold may define one or more resource blocks that may be configured between the first set of frequency domain resources and the second set of frequency domain resources.

For example, UE 505 may use a highest-to-lowest priority level ordering scheme to order each sidelink feedback message in the first set of sidelink feedback messages and the second set of sidelink feedback messages according to the priority level associated with each sidelink feedback message. The mapping may be based on such ordering.

For example, UE 505 may identify a sidelink feedback message that at least partially overlaps with a previously mapped sidelink feedback message having a higher priority level. In this situation, UE 505 may drop the overlapping sidelink feedback message having the lower priority level. In another example, UE 505 may determine that no sidelink feedback messages overlap with previously mapped sidelink feedback messages having a higher priority level. In this situation, UE 505 may include each sidelink feedback message in the appropriate subset of sidelink feedback messages.

In some aspects, UE 505 may determine that the number of sidelink feedback messages in the first subset of sidelink feedback messages satisfies a maximum sidelink feedback message count associated with UE 505. UE 505 may map the sidelink feedback messages in response to the number of sidelink feedback messages satisfying the maximum sidelink feedback message count (e.g., not exceeding the maximum sidelink feedback message count).

At 530, UE 505 may, according to the mapping, transmit the first subset of sidelink feedback messages using the first set of frequency domain resources while concurrently receiving the second subset of sidelink feedback messages using the second set of frequency domain resources. For example, UE 505 may transmit or otherwise provide (and UE 510 may receive or otherwise obtain) the first subset of sidelink feedback messages using the first set of frequency domain resources while, at the same time, receiving or otherwise obtaining (and UE 510 transmitting or otherwise providing) the second subset of sidelink feedback messages using the second set of frequency domain resources.

In the non-limiting example discussed above, the described techniques are provided with reference to UE 505 and UE 510 mapping and transmitting PSFCH transmissions/receptions between each other. However, it is to be understood that the described techniques may be applied in the situation where the receivers and transmitters of the PSFCH messages are different UEs. For example, UE 505 may transmit a first set of sidelink feedback messages to a first sidelink UE while receiving sidelink feedback messages from a second sidelink UE that is different from the first sidelink UE.

Figure 6:
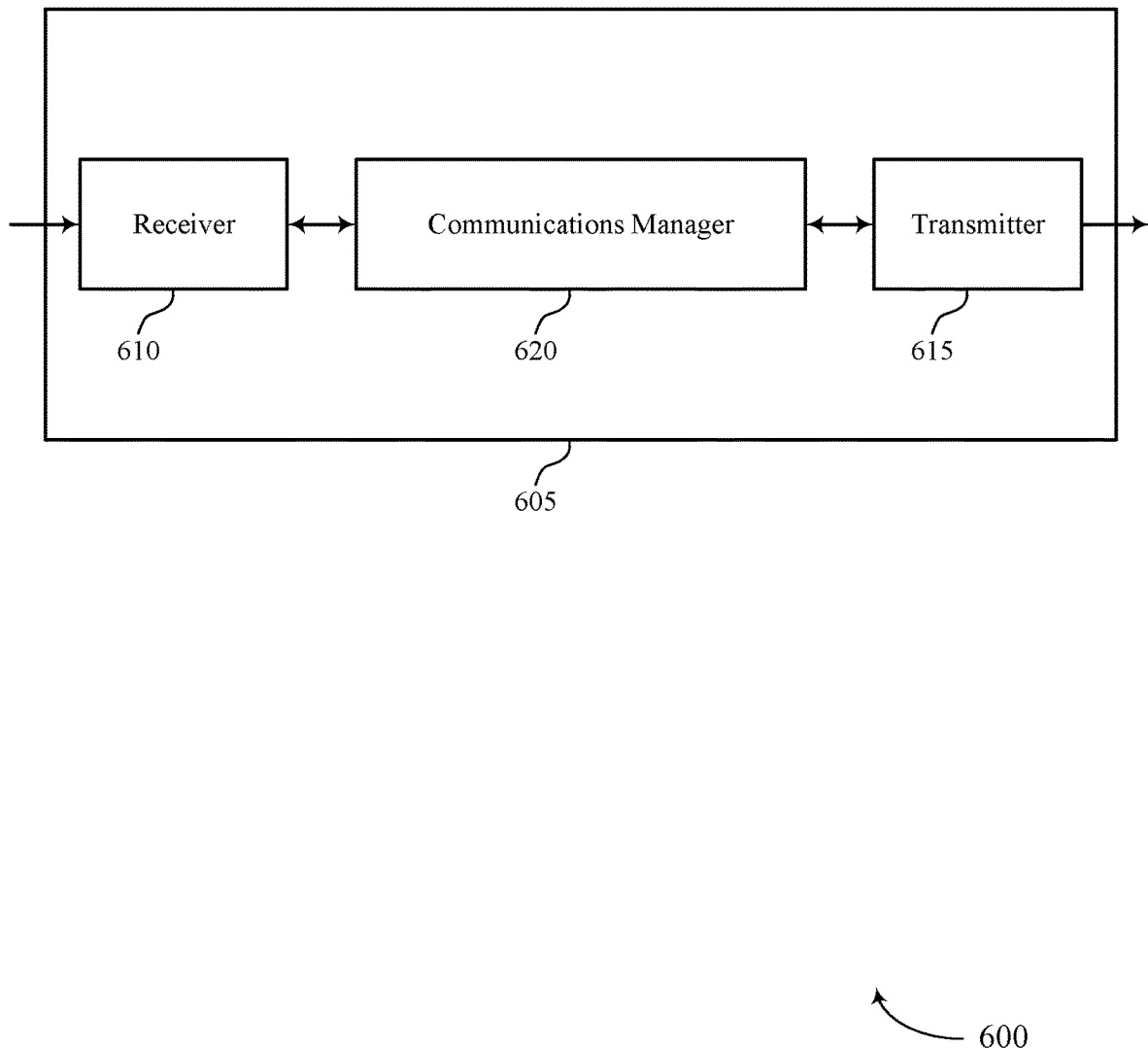
FIGS. 6 and 7 show block diagrams of devices that support full duplex sidelink feedback transmissions and receptions in accordance with aspects of the present disclosure.

FIG. 6 shows a block diagram 600 of a device 605 that supports full duplex sidelink feedback transmissions and receptions in accordance with aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to full duplex sidelink feedback transmissions and receptions). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to full duplex sidelink feedback transmissions and receptions). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of full duplex sidelink feedback transmissions and receptions as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 620 may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a UE in accordance with examples as disclosed herein. For example, the communications manager 620 may be configured as or otherwise support a means for identifying a first set of sidelink feedback messages to transmit and a second set of sidelink feedback messages to receive, the first set of sidelink feedback messages scheduled to be transmitted concurrently with the second set of sidelink feedback messages. The communications manager 620 may be configured as or otherwise support a means for selecting a first subset of sidelink feedback messages from the first set of sidelink feedback messages to transmit and a second subset of sidelink feedback messages from the second set of sidelink feedback messages to receive based on a priority level associated with each sidelink feedback message and a first set of frequency domain resources for the first subset of sidelink feedback messages and a second set of frequency domain resources for the second subset of sidelink feedback messages.

By including or configuring the communications manager 620 in accordance with examples as described herein, the device 605 (e.g., a processor controlling or otherwise coupled to the receiver 610, the transmitter 615, the communications manager 620, or a combination thereof) may support techniques for improved selection and communication of PSFCH HARQ-ACK feedback when operating in a SBFD mode.

Figure 7:
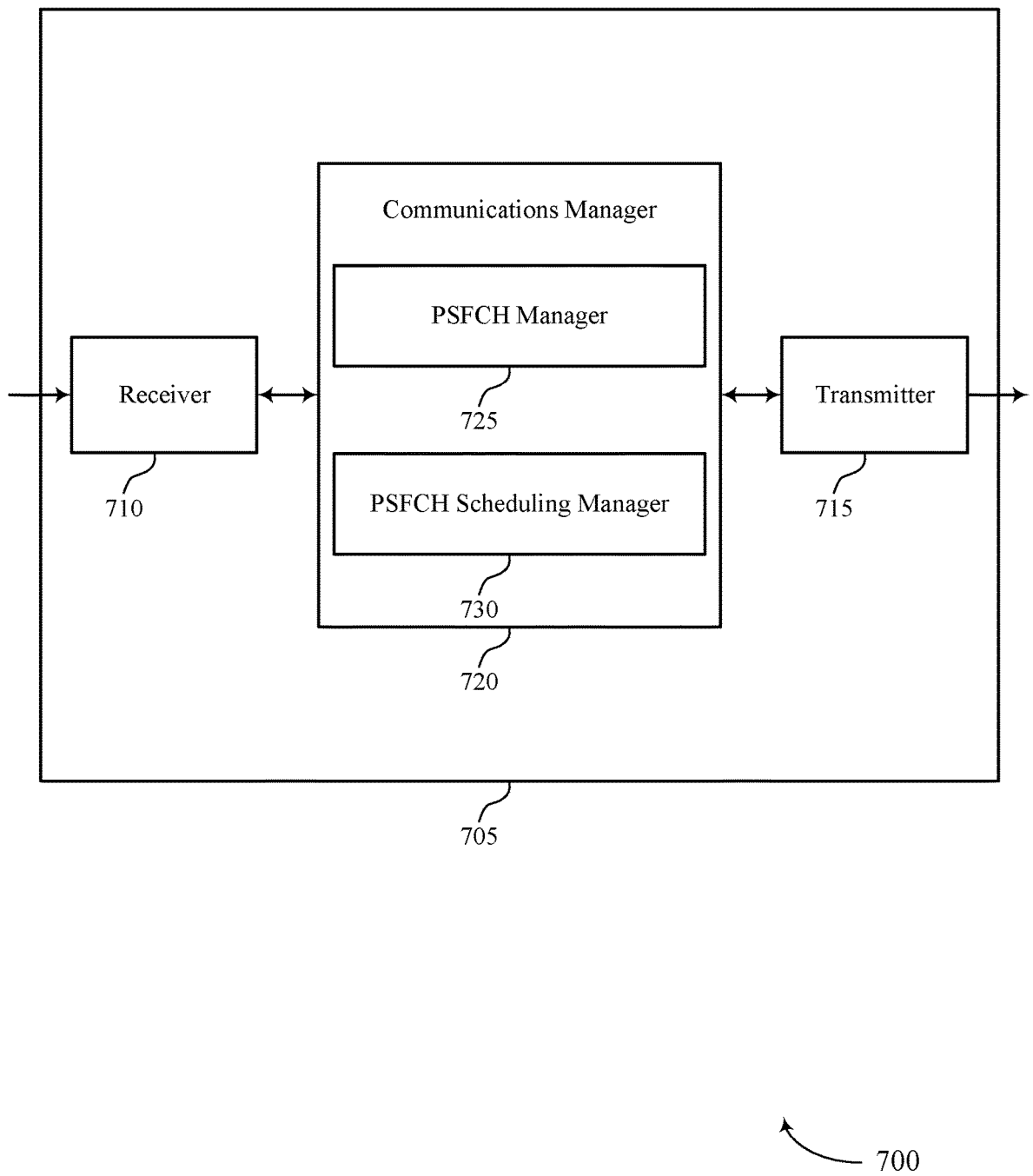

FIG. 7 shows a block diagram 700 of a device 705 that supports full duplex sidelink feedback transmissions and receptions in accordance with aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to full duplex sidelink feedback transmissions and receptions). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to full duplex sidelink feedback transmissions and receptions). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of full duplex sidelink feedback transmissions and receptions as described herein. For example, the communications manager 720 may include an PSFCH manager 725 an PSFCH scheduling manager 730, or any combination thereof. The communications manager 720 may be an example of aspects of a communications manager 620 as described herein. In some examples, the communications manager 720, or various components thereof, may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communication at a UE in accordance with examples as disclosed herein. The PSFCH manager 725 may be configured as or otherwise support a means for identifying a first set of sidelink feedback messages to transmit and a second set of sidelink feedback messages to receive, the first set of sidelink feedback messages scheduled to be transmitted concurrently with the second set of sidelink feedback messages. The PSFCH scheduling manager 730 may be configured as or otherwise support a means for selecting a first subset of sidelink feedback messages from the first set of sidelink feedback messages to transmit and a second subset of sidelink feedback messages from the second set of sidelink feedback messages to receive based on a priority level associated with each sidelink feedback message and a first set of frequency domain resources for the first subset of sidelink feedback messages and a second set of frequency domain resources for the second subset of sidelink feedback messages.

Figure 8:
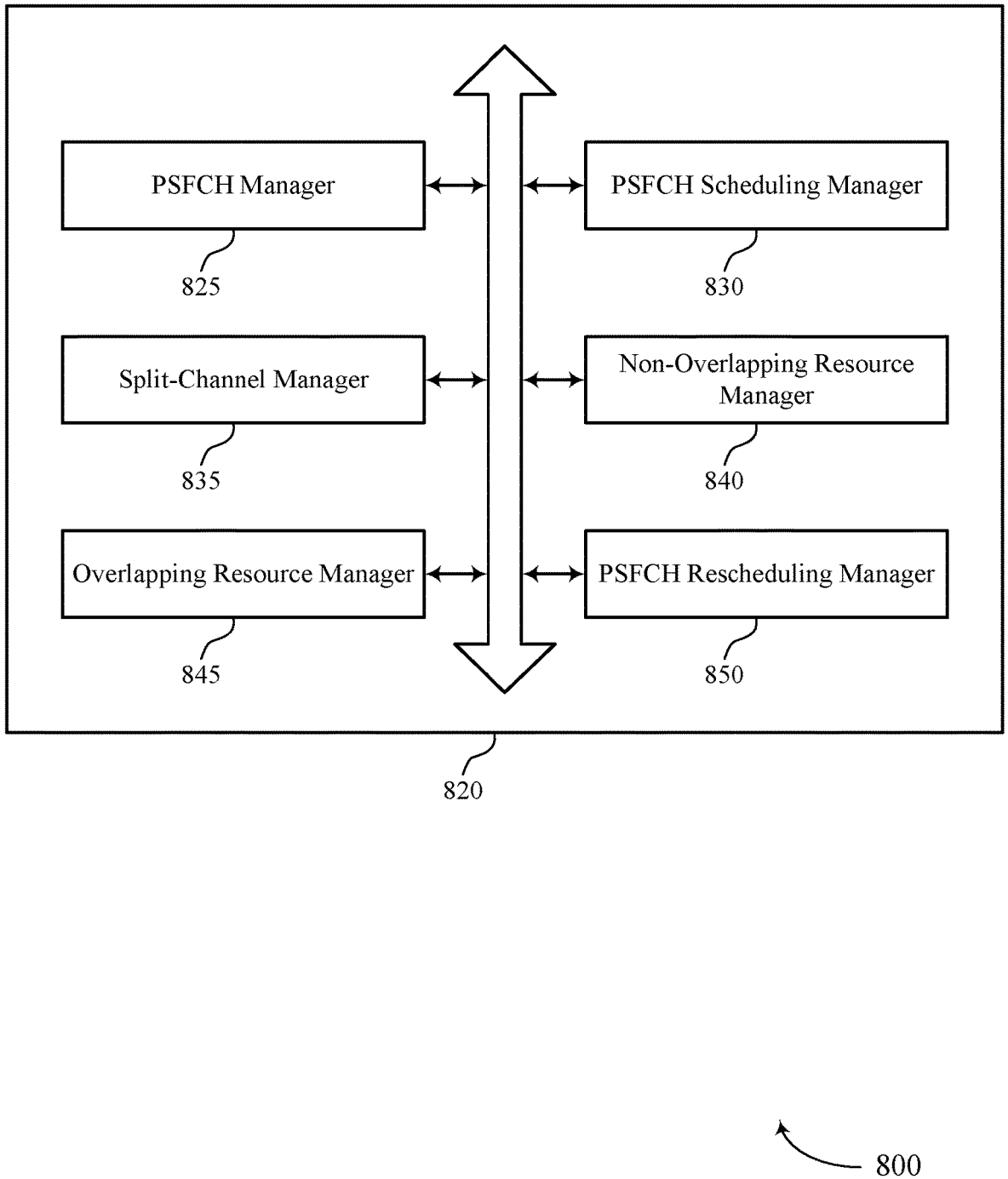
FIG. 8 shows a block diagram of a communications manager that supports full duplex sidelink feedback transmissions and receptions in accordance with aspects of the present disclosure.

FIG. 8 shows a block diagram 800 of a communications manager 820 that supports full duplex sidelink feedback transmissions and receptions in accordance with aspects of the present disclosure. The communications manager 820 may be an example of aspects of a communications manager 620, a communications manager 720, or both, as described herein. The communications manager 820, or various components thereof, may be an example of means for performing various aspects of full duplex sidelink feedback transmissions and receptions as described herein. For example, the communications manager 820 may include an PSFCH manager 825, an PSFCH scheduling manager 830, a split-channel manager 835, a non-overlapping resource manager 840, an overlapping resource manager 845, an PSFCH rescheduling manager 850, or any combination thereof. Each of these components may communicate, directly or indirectly, with one another (e.g., via one or more buses).

The communications manager 820 may support wireless communication at a UE in accordance with examples as disclosed herein. The PSFCH manager 825 may be configured as or otherwise support a means for identifying a first set of sidelink feedback messages to transmit and a second set of sidelink feedback messages to receive, the first set of sidelink feedback messages scheduled to be transmitted concurrently with the second set of sidelink feedback messages. The PSFCH scheduling manager 830 may be configured as or otherwise support a means for selecting a first subset of sidelink feedback messages from the first set of sidelink feedback messages to transmit and a second subset of sidelink feedback messages from the second set of sidelink feedback messages to receive based on a priority level associated with each sidelink feedback message and a first set of frequency domain resources for the first subset of sidelink feedback messages and a second set of frequency domain resources for the second subset of sidelink feedback messages.

In some examples, the split-channel manager 835 may be configured as or otherwise support a means for mapping the first set of sidelink feedback messages to the first set of frequency domain resources and the second set of sidelink feedback messages to a second subset of frequency domain resources based on the priority level of each sidelink feedback message and a set of gap frequency resources configured between the first set of frequency domain resources and the second set of frequency domain resources satisfying a gap threshold. In some examples, the split-channel manager 835 may be configured as or otherwise support a means for transmitting, in accordance with the mapping, the first subset of sidelink feedback messages using the first set of frequency domain resources while concurrently receiving the second subset of sidelink feedback messages using the second set of frequency domain resources.

In some examples, the split-channel manager 835 may be configured as or otherwise support a means for ordering, using a highest-to-lowest priority level ordering, each sidelink feedback message in the first set of sidelink feedback messages and the second set of sidelink feedback messages according to the priority level associated with each sidelink feedback message, where the mapping is based on the ordering.

In some examples, to support mapping the first subset of sidelink feedback messages to the first set of frequency domain resources and the second subset of sidelink feedback messages to the second set of frequency domain resources, the split-channel manager 835 may be configured as or otherwise support a means for identifying, according to the priority level associated with each sidelink feedback message, a sidelink feedback that at least partially overlaps with a previously mapped sidelink feedback message having a higher priority level. In some examples, to support mapping the first subset of sidelink feedback messages to the first set of frequency domain resources and the second subset of sidelink feedback messages to the second set of frequency domain resources, the split-channel manager 835 may be configured as or otherwise support a means for dropping the sidelink feedback message based on the at least partial overlap with the previously mapped sidelink feedback message having the higher priority level.

In some examples, to support mapping the first subset of sidelink feedback messages to the first set of frequency domain resources and the second subset of sidelink feedback messages to the second set of frequency domain resources, the split-channel manager 835 may be configured as or otherwise support a means for determining, according to the priority level associated with each sidelink feedback message, that no sidelink feedback message at least partially overlaps with a previously mapped sidelink feedback message having a higher priority level. In some examples, to support mapping the first subset of sidelink feedback messages to the first set of frequency domain resources and the second subset of sidelink feedback messages to the second set of frequency domain resources, the split-channel manager 835 may be configured as or otherwise support a means for including, according to the gap threshold, each sidelink feedback message in the first subset of sidelink feedback messages or the second subset of sidelink feedback messages.

In some examples, the split-channel manager 835 may be configured as or otherwise support a means for determining that a number of sidelink feedback messages in the first subset of sidelink feedback messages satisfy a maximum sidelink feedback message count associated with the UE, where the mapping is based on the number of sidelink feedback messages satisfying the maximum sidelink feedback message count.

In some examples, to support mapping the first subset of sidelink feedback messages to the first set of frequency domain resources and the second subset of sidelink feedback messages to the second set of frequency domain resources, the split-channel manager 835 may be configured as or otherwise support a means for identifying a first sidelink feedback channel on a first resource and a second sidelink feedback channel on a second resource, where the set of gap frequency resources between the first resource and the second resource fails to satisfy the gap threshold, the first sidelink feedback channel having a different direction and a lower priority level than the second sidelink feedback channel. In some examples, to support mapping the first subset of sidelink feedback messages to the first set of frequency domain resources and the second subset of sidelink feedback messages to the second set of frequency domain resources, the split-channel manager 835 may be configured as or otherwise support a means for dropping the first sidelink feedback channel based on the failing to satisfy the gap threshold and the priority level.

In some examples, the non-overlapping resource manager 840 may be configured as or otherwise support a means for determining that each sidelink feedback message in the first subset of sidelink feedback messages and the second subset of sidelink feedback messages is non-overlapping with one or more instances of a set of gap frequency resources, where transmitting the first subset of sidelink feedback messages while concurrently receiving the second subset of sidelink feedback messages is based on the non-overlapping. In some examples, the set of gap frequency resources are not configured between two or more instances of the first subset of sidelink feedback messages or between two or more instances of the second subset of sidelink feedback messages.

In some examples, the overlapping resource manager 845 may be configured as or otherwise support a means for determining that a sidelink feedback message reception in the second set of sidelink feedback messages is in between two sidelink feedback message transmissions in the second set of sidelink feedback messages, where transmitting the first subset of sidelink feedback messages while concurrently receiving the second subset of sidelink feedback messages further includes dropping at least one of the two sidelink feedback message transmissions based on the sidelink feedback message reception being in between the two sidelink feedback message transmissions and the priority level of each sidelink feedback message.

In some examples, the overlapping resource manager 845 may be configured as or otherwise support a means for determining that a sidelink feedback message reception in the second set of sidelink feedback messages is in between two sidelink feedback message transmissions in the second set of sidelink feedback messages, where transmitting the first subset of sidelink feedback messages while concurrently receiving the second subset of sidelink feedback messages further includes dropping the sidelink feedback message reception based on the sidelink feedback message reception being in between the two sidelink feedback message transmissions and the priority level of each sidelink feedback message. In some examples, transmitting the first subset of sidelink feedback messages while concurrently receiving the second subset of sidelink feedback messages is performed while operating in a sub-band full duplex mode.

In some examples, the PSFCH rescheduling manager 850 may be configured as or otherwise support a means for identifying one or more sidelink feedback messages that were dropped from the first set of sidelink feedback messages, the second set of sidelink feedback messages, or both. In some examples, the PSFCH rescheduling manager 850 may be configured as or otherwise support a means for scheduling the one or more sidelink feedback messages separately from transmitting the first subset of sidelink feedback messages using the first set of frequency domain resources while concurrently receiving the second subset of sidelink feedback messages using the second set of frequency domain resources.

Figure 9:
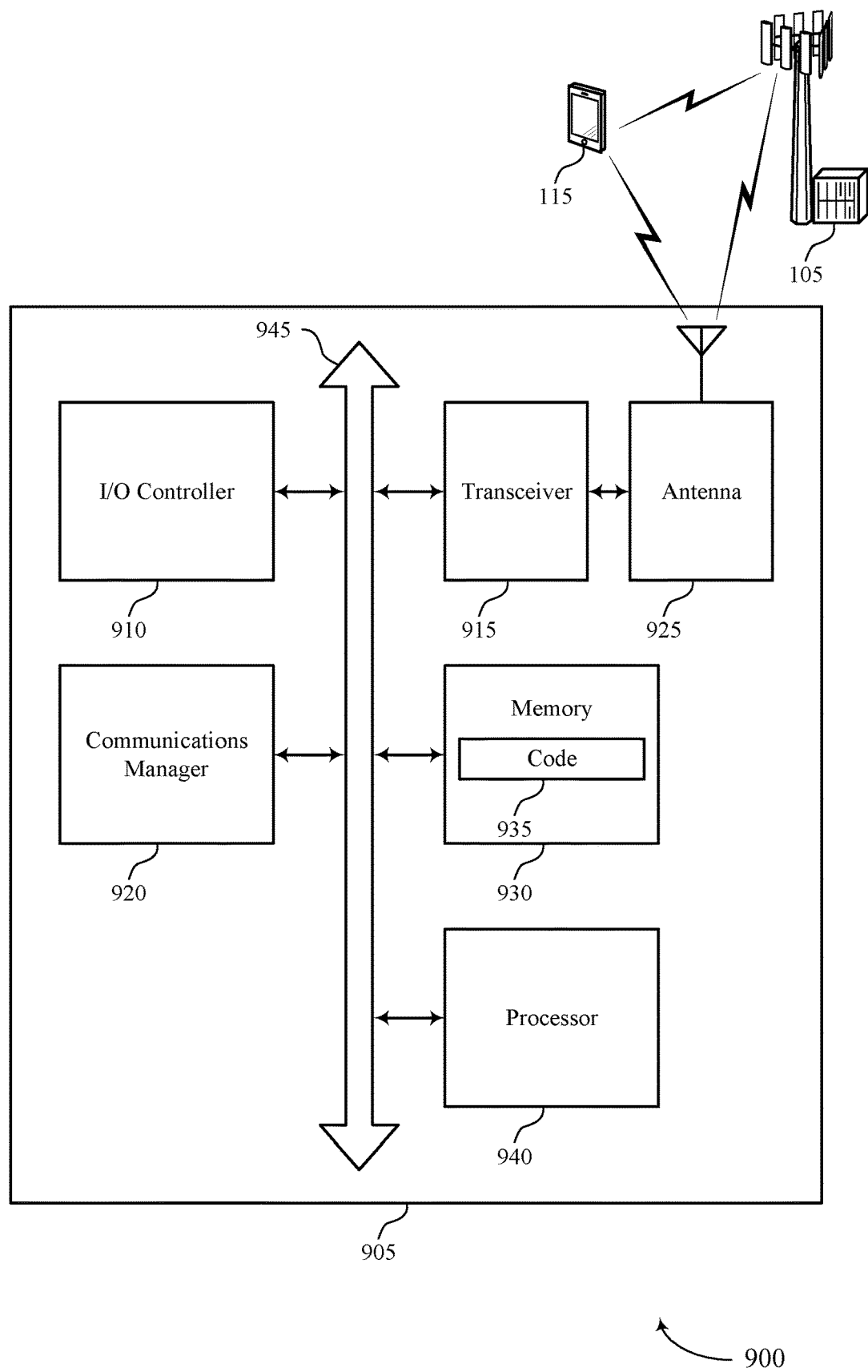
FIG. 9 shows a diagram of a system including a device that supports full duplex sidelink feedback transmissions and receptions in accordance with aspects of the present disclosure.

FIG. 9 shows a diagram of a system 900 including a device 905 that supports full duplex sidelink feedback transmissions and receptions in accordance with aspects of the present disclosure. The device 905 may be an example of or include the components of a device 605, a device 705, or a UE 115 as described herein. The device 905 may communicate wirelessly with one or more base stations 105, UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally, or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting full duplex sidelink feedback transmissions and receptions). For example, the device 905 or a component of the device 905 may include a processor 940 and memory 930 coupled to the processor 940, the processor 940 and memory 930 configured to perform various functions described herein.

The communications manager 920 may support wireless communication at a UE in accordance with examples as disclosed herein. For example, the communications manager 920 may be configured as or otherwise support a means for identifying a first set of sidelink feedback messages to transmit and a second set of sidelink feedback messages to receive, the first set of sidelink feedback messages scheduled to be transmitted concurrently with the second set of sidelink feedback messages. The communications manager 920 may be configured as or otherwise support a means for selecting a first subset of sidelink feedback messages from the first set of sidelink feedback messages to transmit and a second subset of sidelink feedback messages from the second set of sidelink feedback messages to receive based on a priority level associated with each sidelink feedback message and a first set of frequency domain resources for the first subset of sidelink feedback messages and a second set of frequency domain resources for the second subset of sidelink feedback messages.

By including or configuring the communications manager 920 in accordance with examples as described herein, the device 905 may support techniques for improved selection and communication of PSFCH HARQ-ACK feedback when operating in a SBFD mode.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of full duplex sidelink feedback transmissions and receptions as described herein, or the processor 940 and the memory 930 may be otherwise configured to perform or support such operations.

Figure 10:
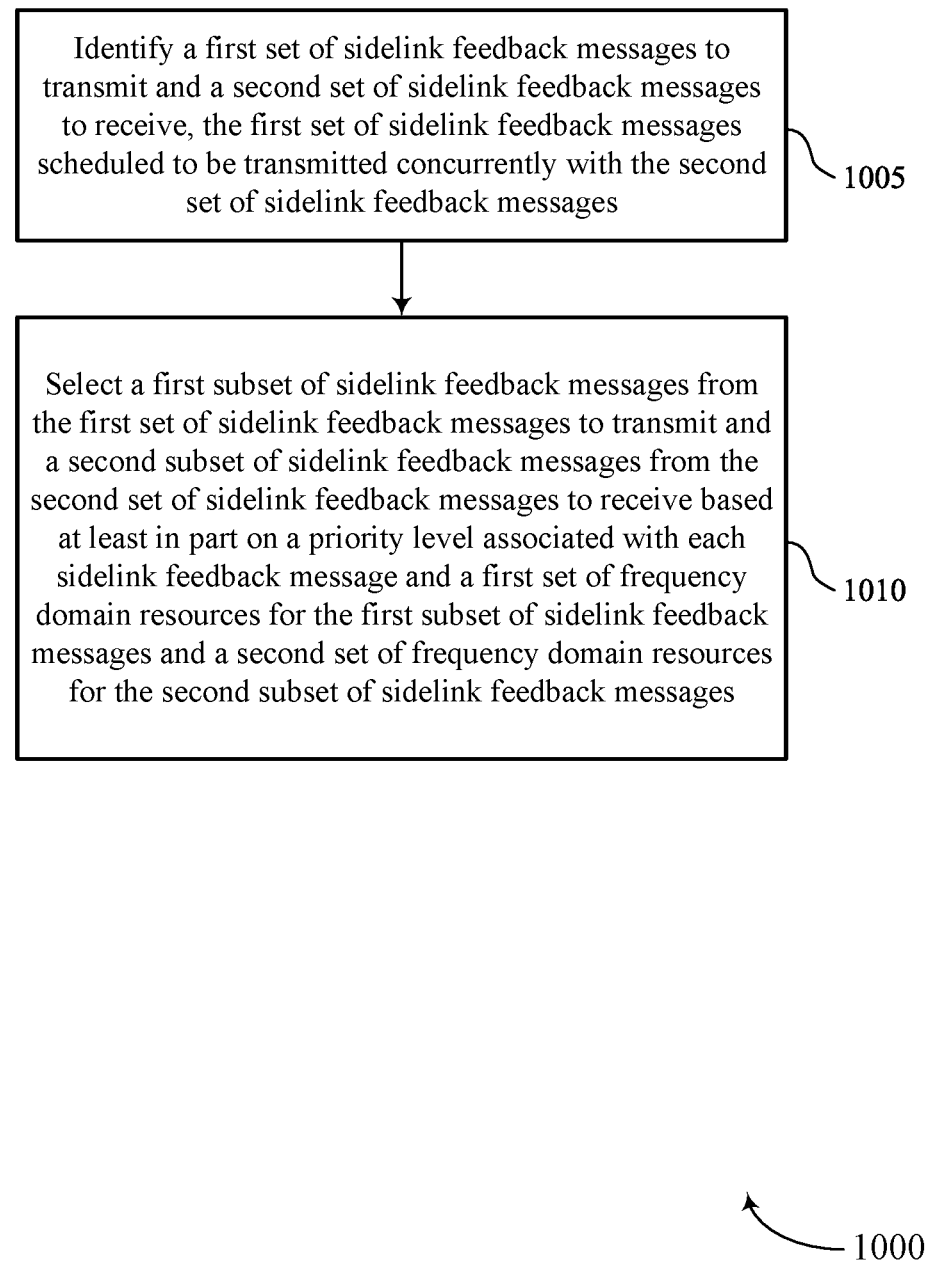
FIGS. 10 through 12 show flowcharts illustrating methods that support full duplex sidelink feedback transmissions and receptions in accordance with aspects of the present disclosure.

FIG. 10 shows a flowchart illustrating a method 1000 that supports full duplex sidelink feedback transmissions and receptions in accordance with aspects of the present disclosure. The operations of the method 1000 may be implemented by a UE or its components as described herein. For example, the operations of the method 1000 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1005, the method may include identifying a first set of sidelink feedback messages to transmit and a second set of sidelink feedback messages to receive, the first set of sidelink feedback messages scheduled to be transmitted concurrently with the second set of sidelink feedback messages. The operations of 1005 may be performed in accordance with examples as disclosed herein. In some examples, aspects of the operations of 1005 may be performed by an PSFCH manager 825 as described with reference to FIG. 8.

At 1010, the method may include selecting a first subset of sidelink feedback messages from the first set of sidelink feedback messages to transmit and a second subset of sidelink feedback messages from the second set of sidelink feedback messages to receive based on a priority level associated with each sidelink feedback message and a first set of frequency domain resources for the first subset of sidelink feedback messages and a second set of frequency domain resources for the second subset of sidelink feedback messages. The operations of 1010 may be performed in accordance with examples as disclosed herein. In some examples, aspects of the operations of 1010 may be performed by an PSFCH scheduling manager 830 as described with reference to FIG. 8.

Figure 11:
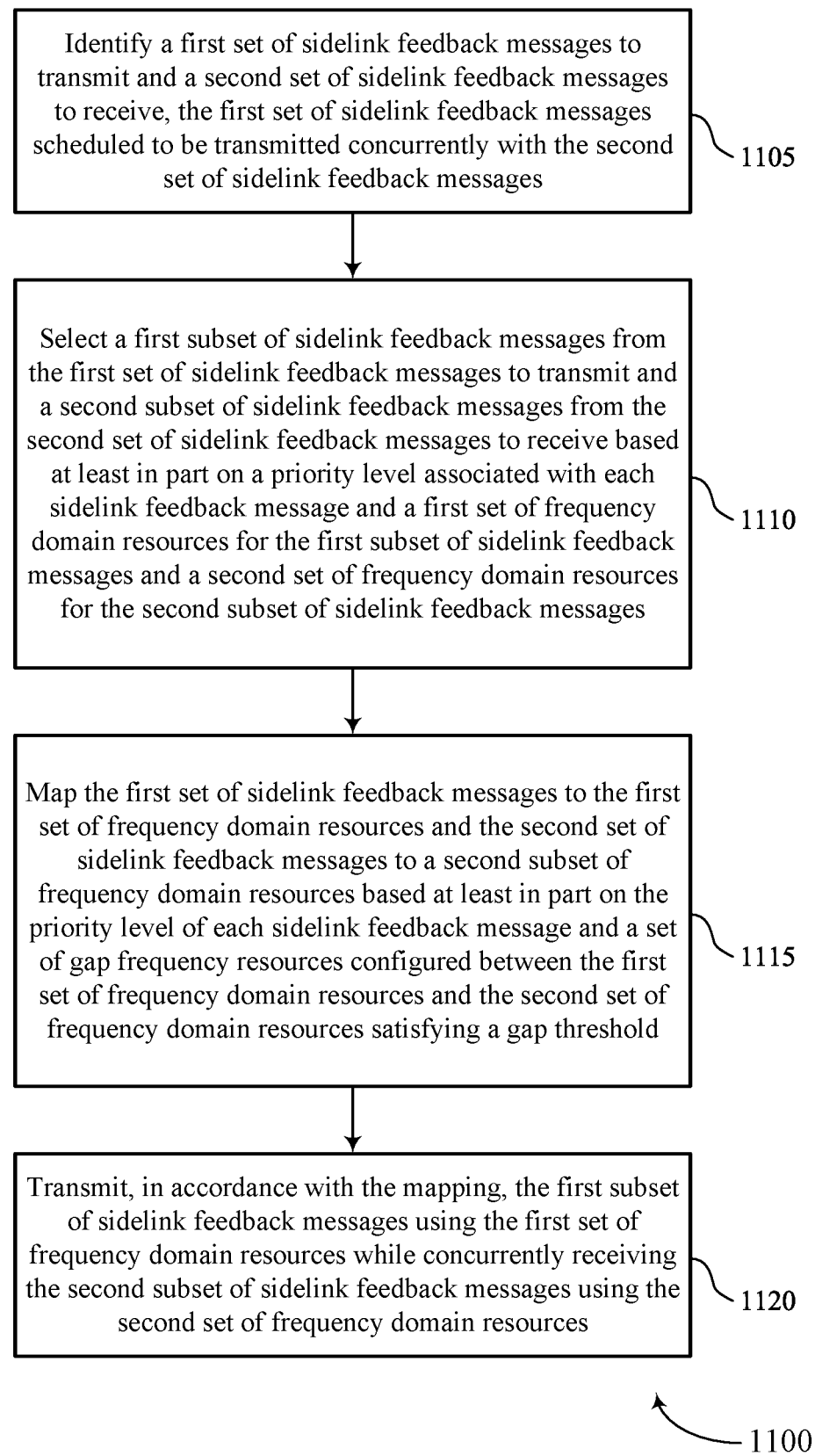

FIG. 11 shows a flowchart illustrating a method 1100 that supports full duplex sidelink feedback transmissions and receptions in accordance with aspects of the present disclosure. The operations of the method 1100 may be implemented by a UE or its components as described herein. For example, the operations of the method 1100 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1105, the method may include identifying a first set of sidelink feedback messages to transmit and a second set of sidelink feedback messages to receive, the first set of sidelink feedback messages scheduled to be transmitted concurrently with the second set of sidelink feedback messages. The operations of 1105 may be performed in accordance with examples as disclosed herein. In some examples, aspects of the operations of 1105 may be performed by an PSFCH manager 825 as described with reference to FIG. 8.

At 1110, the method may include selecting a first subset of sidelink feedback messages from the first set of sidelink feedback messages to transmit and a second subset of sidelink feedback messages from the second set of sidelink feedback messages to receive based on a priority level associated with each sidelink feedback message and a first set of frequency domain resources for the first subset of sidelink feedback messages and a second set of frequency domain resources for the second subset of sidelink feedback messages. The operations of 1110 may be performed in accordance with examples as disclosed herein. In some examples, aspects of the operations of 1110 may be performed by an PSFCH scheduling manager 830 as described with reference to FIG. 8.

At 1115, the method may include mapping the first set of sidelink feedback messages to the first set of frequency domain resources and the second set of sidelink feedback messages to a second subset of frequency domain resources based on the priority level of each sidelink feedback message and a set of gap frequency resources configured between the first set of frequency domain resources and the second set of frequency domain resources satisfying a gap threshold. The operations of 1115 may be performed in accordance with examples as disclosed herein. In some examples, aspects of the operations of 1115 may be performed by a split-channel manager 835 as described with reference to FIG. 8.

At 1120, the method may include transmitting, in accordance with the mapping, the first subset of sidelink feedback messages using the first set of frequency domain resources while concurrently receiving the second subset of sidelink feedback messages using the second set of frequency domain resources. The operations of 1120 may be performed in accordance with examples as disclosed herein. In some examples, aspects of the operations of 1120 may be performed by a split-channel manager 835 as described with reference to FIG. 8.

Figure 12:
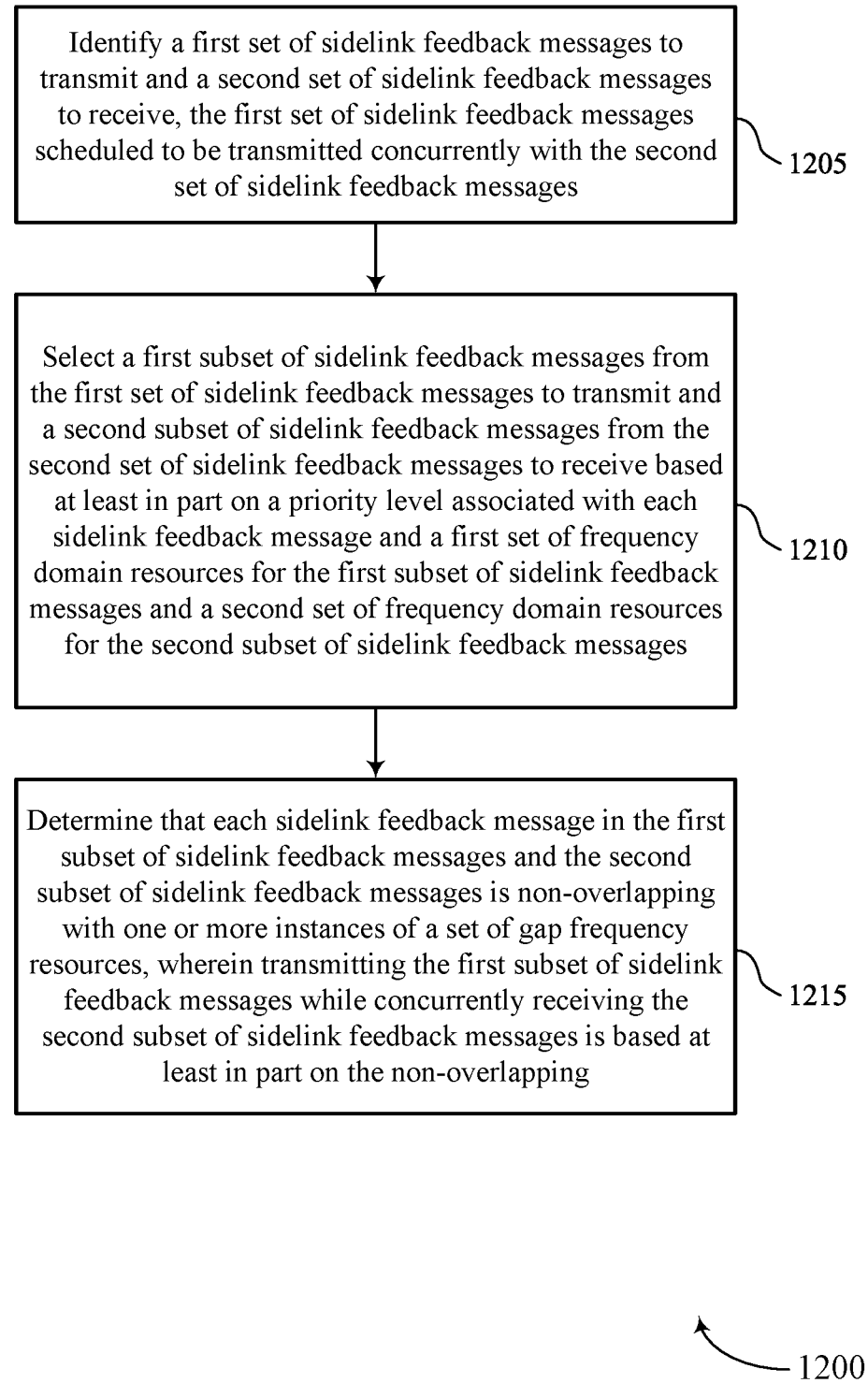

FIG. 12 shows a flowchart illustrating a method 1200 that supports full duplex sidelink feedback transmissions and receptions in accordance with aspects of the present disclosure. The operations of the method 1200 may be implemented by a UE or its components as described herein. For example, the operations of the method 1200 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1205, the method may include identifying a first set of sidelink feedback messages to transmit and a second set of sidelink feedback messages to receive, the first set of sidelink feedback messages scheduled to be transmitted concurrently with the second set of sidelink feedback messages. The operations of 1205 may be performed in accordance with examples as disclosed herein. In some examples, aspects of the operations of 1205 may be performed by an PSFCH manager 825 as described with reference to FIG. 8.

At 1210, the method may include selecting a first subset of sidelink feedback messages from the first set of sidelink feedback messages to transmit and a second subset of sidelink feedback messages from the second set of sidelink feedback messages to receive based on a priority level associated with each sidelink feedback message and a first set of frequency domain resources for the first subset of sidelink feedback messages and a second set of frequency domain resources for the second subset of sidelink feedback messages. The operations of 1210 may be performed in accordance with examples as disclosed herein. In some examples, aspects of the operations of 1210 may be performed by an PSFCH scheduling manager 830 as described with reference to FIG. 8.

At 1215, the method may include determining that each sidelink feedback message in the first subset of sidelink feedback messages and the second subset of sidelink feedback messages is non-overlapping with one or more instances of a set of gap frequency resources, where transmitting the first subset of sidelink feedback messages while concurrently receiving the second subset of sidelink feedback messages is based on the non-overlapping. The operations of 1215 may be performed in accordance with examples as disclosed herein. In some examples, aspects of the operations of 1215 may be performed by a non-overlapping resource manager 840 as described with reference to FIG. 8.

The following provides an overview of aspects of the present disclosure:

Aspect 1: A method for wireless communication at a UE, comprising: identifying a first set of sidelink feedback messages to transmit and a second set of sidelink feedback messages to receive, the first set of sidelink feedback messages scheduled to be transmitted concurrently with the second set of sidelink feedback messages; and selecting a first subset of sidelink feedback messages from the first set of sidelink feedback messages to transmit and a second subset of sidelink feedback messages from the second set of sidelink feedback messages to receive based at least in part on a priority level associated with each sidelink feedback message and a first set of frequency domain resources for the first subset of sidelink feedback messages and a second set of frequency domain resources for the second subset of sidelink feedback messages.

Aspect 2: The method of aspect 1, further comprising: mapping the first set of sidelink feedback messages to the first set of frequency domain resources and the second set of sidelink feedback messages to a second subset of frequency domain resources based at least in part on the priority level of each sidelink feedback message and a set of gap frequency resources configured between the first set of frequency domain resources and the second set of frequency domain resources satisfying a gap threshold; and transmitting, in accordance with the mapping, the first subset of sidelink feedback messages using the first set of frequency domain resources while concurrently receiving the second subset of sidelink feedback messages using the second set of frequency domain resources.

Aspect 3: The method of aspect 2, further comprising: ordering, using a highest-to-lowest priority level ordering, each sidelink feedback message in the first set of sidelink feedback messages and the second set of sidelink feedback messages according to the priority level associated with each sidelink feedback message, wherein the mapping is based at least in part on the ordering.

Aspect 4: The method of any of aspects 2 through 3, wherein the mapping the first subset of sidelink feedback messages to the first set of frequency domain resources and the second subset of sidelink feedback messages to the second set of frequency domain resources further comprises: identifying, according to the priority level associated with each sidelink feedback message, a sidelink feedback that at least partially overlaps with a previously mapped sidelink feedback message having a higher priority level; and dropping the sidelink feedback message based at least in part on the at least partial overlap with the previously mapped sidelink feedback message having the higher priority level.

Aspect 5: The method of any of aspects 2 through 4, wherein the mapping the first subset of sidelink feedback messages to the first set of frequency domain resources and the second subset of sidelink feedback messages to the second set of frequency domain resources further comprises: determining, according to the priority level associated with each sidelink feedback message, that no sidelink feedback message at least partially overlaps with a previously mapped sidelink feedback message having a higher priority level; and including, according to the gap threshold, each sidelink feedback message in the first subset of sidelink feedback messages or the second subset of sidelink feedback messages.

Aspect 6: The method of any of aspects 2 through 5, further comprising: determining that a number of sidelink feedback messages in the first subset of sidelink feedback messages satisfy a maximum sidelink feedback message count associated with the UE, wherein the mapping is based at least in part on the number of sidelink feedback messages satisfying the maximum sidelink feedback message count.

Aspect 7: The method of any of aspects 2 through 6, wherein the mapping the first subset of sidelink feedback messages to the first set of frequency domain resources and the second subset of sidelink feedback messages to the second set of frequency domain resources further comprises: identifying a first sidelink feedback channel on a first resource and a second sidelink feedback channel on a second resource, wherein the set of gap frequency resources between the first resource and the second resource fails to satisfy the gap threshold, the first sidelink feedback channel having a different direction and a lower priority level than the second sidelink feedback channel; and dropping the first sidelink feedback channel based at least in part on the failing to satisfy the gap threshold and the priority level.

Aspect 8: The method of any of aspects 1 through 7, further comprising: determining that each sidelink feedback message in the first subset of sidelink feedback messages and the second subset of sidelink feedback messages is non-overlapping with one or more instances of a set of gap frequency resources, wherein transmitting the first subset of sidelink feedback messages while concurrently receiving the second subset of sidelink feedback messages is based at least in part on the non-overlapping.

Aspect 9: The method of aspect 8, wherein the set of gap frequency resources are not configured between two or more instances of the first subset of sidelink feedback messages or between two or more instances of the second subset of sidelink feedback messages.

Aspect 10: The method of any of aspects 1 through 9, further comprising: determining that a sidelink feedback message reception in the second set of sidelink feedback messages is in between two sidelink feedback message transmissions in the second set of sidelink feedback messages, wherein transmitting the first subset of sidelink feedback messages while concurrently receiving the second subset of sidelink feedback messages further comprises dropping at least one of the two sidelink feedback message transmissions based at least in part on the sidelink feedback message reception being in between the two sidelink feedback message transmissions and the priority level of each sidelink feedback message.

Aspect 11: The method of any of aspects 1 through 10, further comprising: determining that a sidelink feedback message reception in the second set of sidelink feedback messages is in between two sidelink feedback message transmissions in the second set of sidelink feedback messages, wherein transmitting the first subset of sidelink feedback messages while concurrently receiving the second subset of sidelink feedback messages further comprises dropping the sidelink feedback message reception based at least in part on the sidelink feedback message reception being in between the two sidelink feedback message transmissions and the priority level of each sidelink feedback message.

Aspect 12: The method of any of aspects 1 through 11, wherein transmitting the first subset of sidelink feedback messages while concurrently receiving the second subset of sidelink feedback messages is performed while operating in a sub-band full duplex mode.

Aspect 13: The method of any of aspects 1 through 12, further comprising: identifying one or more sidelink feedback messages that were dropped from the first set of sidelink feedback messages, the second set of sidelink feedback messages, or both; and scheduling the one or more sidelink feedback messages separately from transmitting the first subset of sidelink feedback messages using the first set of frequency domain resources while concurrently receiving the second subset of sidelink feedback messages using the second set of frequency domain resources.

Aspect 14: An apparatus for wireless communication at a UE, comprising a processor; memory coupled with the processor; and instructions stored in the memory and executable by the processor to cause the apparatus to perform a method of any of aspects 1 through 13.

Aspect 15: An apparatus for wireless communication at a UE, comprising at least one means for performing a method of any of aspects 1 through 13.

Aspect 16: A non-transitory computer-readable medium storing code for wireless communication at a UE, the code comprising instructions executable by a processor to perform a method of any of aspects 1 through 13.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:

identifying a first set of sidelink feedback messages to transmit and a second set of sidelink feedback messages to receive, the first set of sidelink feedback messages scheduled to be transmitted concurrently with the second set of sidelink feedback messages; and selecting a first subset of sidelink feedback messages from the first set of sidelink feedback messages to transmit and a second subset of sidelink feedback messages from the second set of sidelink feedback messages to receive based at least in part on a priority level associated with each sidelink feedback message and a first set of frequency domain resources for the first subset of sidelink feedback messages and a second set of frequency domain resources for the second subset of sidelink feedback messages.

2. The method of claim 1, further comprising:
mapping the first set of sidelink feedback messages to the first set of frequency domain resources and the second set of sidelink feedback messages to a second subset of frequency domain resources based at least in part on the priority level of each sidelink feedback message and a set of gap frequency resources configured between the first set of frequency domain resources and the second set of frequency domain resources satisfying a gap threshold; and
transmitting, in accordance with the mapping, the first subset of sidelink feedback messages using the first set of frequency domain resources while concurrently receiving the second subset of sidelink feedback messages using the second set of frequency domain resources.

3. The method of claim 2, further comprising:
ordering, using a highest-to-lowest priority level ordering, each sidelink feedback message in the first set of sidelink feedback messages and the second set of sidelink feedback messages according to the priority level associated with each sidelink feedback message, wherein the mapping is based at least in part on the ordering.

4. The method of claim 2, wherein the mapping the first subset of sidelink feedback messages to the first set of frequency domain resources and the second subset of sidelink feedback messages to the second set of frequency domain resources further comprises:
identifying, according to the priority level associated with each sidelink feedback message, a sidelink feedback that at least partially overlaps with a previously mapped sidelink feedback message having a higher priority level; and
dropping the sidelink feedback message based at least in part on the at least partial overlap with the previously mapped sidelink feedback message having the higher priority level.

5. The method of claim 2, wherein the mapping the first subset of sidelink feedback messages to the first set of frequency domain resources and the second subset of sidelink feedback messages to the second set of frequency domain resources further comprises:
determining, according to the priority level associated with each sidelink feedback message, that no sidelink feedback message at least partially overlaps with a previously mapped sidelink feedback message having a higher priority level; and
including, according to the gap threshold, each sidelink feedback message in the first subset of sidelink feedback messages or the second subset of sidelink feedback messages.

6. The method of claim 2, further comprising:
determining that a number of sidelink feedback messages in the first subset of sidelink feedback messages satisfy a maximum sidelink feedback message count associated with the UE, wherein the mapping is based at least in part on the number of sidelink feedback messages satisfying the maximum sidelink feedback message count.

7. The method of claim 2, wherein the mapping the first subset of sidelink feedback messages to the first set of frequency domain resources and the second subset of sidelink feedback messages to the second set of frequency domain resources further comprises:
identifying a first sidelink feedback channel on a first resource and a second sidelink feedback channel on a second resource, wherein the set of gap frequency resources between the first resource and the second resource fails to satisfy the gap threshold, the first sidelink feedback channel having a different direction and a lower priority level than the second sidelink feedback channel; and
dropping the first sidelink feedback channel based at least in part on the failing to satisfy the gap threshold and the priority level.

8. The method of claim 1, further comprising:
determining that each sidelink feedback message in the first subset of sidelink feedback messages and the second subset of sidelink feedback messages is non-overlapping with one or more instances of a set of gap frequency resources, wherein transmitting the first subset of sidelink feedback messages while concurrently receiving the second subset of sidelink feedback messages is based at least in part on the non-overlapping.

9. The method of claim 8, wherein the set of gap frequency resources are not configured between two or more instances of the first subset of sidelink feedback messages or between two or more instances of the second subset of sidelink feedback messages.

10. The method of claim 1, further comprising:
determining that a sidelink feedback message reception in the second set of sidelink feedback messages is in between two sidelink feedback message transmissions in the second set of sidelink feedback messages, wherein transmitting the first subset of sidelink feedback messages while concurrently receiving the second subset of sidelink feedback messages further comprises dropping at least one of the two sidelink feedback message transmissions based at least in part on the sidelink feedback message reception being in between the two sidelink feedback message transmissions and the priority level of each sidelink feedback message.

11. The method of claim 1, further comprising:
determining that a sidelink feedback message reception in the second set of sidelink feedback messages is in between two sidelink feedback message transmissions in the second set of sidelink feedback messages, wherein transmitting the first subset of sidelink feedback messages while concurrently receiving the second subset of sidelink feedback messages further comprises dropping the sidelink feedback message reception based at least in part on the sidelink feedback message reception being in between the two sidelink feedback message transmissions and the priority level of each sidelink feedback message.

12. The method of claim 1, wherein transmitting the first subset of sidelink feedback messages while concurrently receiving the second subset of sidelink feedback messages is performed while operating in a sub-band full duplex mode.

13. The method of claim 1, further comprising:
identifying one or more sidelink feedback messages that were dropped from the first set of sidelink feedback messages, the second set of sidelink feedback messages, or both; and
scheduling the one or more sidelink feedback messages separately from transmitting the first subset of sidelink feedback messages using the first set of frequency domain resources while concurrently receiving the second subset of sidelink feedback messages using the second set of frequency domain resources.

14. An apparatus for wireless communication at a user equipment (UE), comprising:
a processor;
memory coupled with the processor; and
instructions stored in the memory and executable by the processor to cause the apparatus to:
identify a first set of sidelink feedback messages to transmit and a second set of sidelink feedback messages to receive, the first set of sidelink feedback messages scheduled to be transmitted concurrently with the second set of sidelink feedback messages; and
select a first subset of sidelink feedback messages from the first set of sidelink feedback messages to transmit and a second subset of sidelink feedback messages from the second set of sidelink feedback messages to receive based at least in part on a priority level associated with each sidelink feedback message and a first set of frequency domain resources for the first subset of sidelink feedback messages and a second set of frequency domain resources for the second subset of sidelink feedback messages.

15. The apparatus of claim 14, wherein the instructions are further executable by the processor to cause the apparatus to:
map the first set of sidelink feedback messages to the first set of frequency domain resources and the second set of sidelink feedback messages to a second subset of frequency domain resources based at least in part on the priority level of each sidelink feedback message and a set of gap frequency resources configured between the first set of frequency domain resources and the second set of frequency domain resources satisfying a gap threshold; and
transmit, in accordance with the mapping, the first subset of sidelink feedback messages using the first set of frequency domain resources while concurrently receiving the second subset of sidelink feedback messages using the second set of frequency domain resources.

16. The apparatus of claim 15, wherein the instructions are further executable by the processor to cause the apparatus to:
order, used a highest-to-lowest priority level ordering, each sidelink feedback message in the first set of sidelink feedback messages and the second set of sidelink feedback messages according to the priority level associated with each sidelink feedback message, wherein the mapping is based at least in part on the ordering.

17. The apparatus of claim 15, wherein the instructions to mapping the first subset of sidelink feedback messages to the first set of frequency domain resources and the second subset of sidelink feedback messages to the second set of frequency domain resources are further executable by the processor to cause the apparatus to:
identify, according to the priority level associated with each sidelink feedback message, a sidelink feedback that at least partially overlaps with a previously mapped sidelink feedback message having a higher priority level; and drop the sidelink feedback message based at least in part on the at least partial overlap with the previously mapped sidelink feedback message having the higher priority level.

18. The apparatus of claim 15, wherein the instructions to mapping the first subset of sidelink feedback messages to the first set of frequency domain resources and the second subset of sidelink feedback messages to the second set of frequency domain resources are further executable by the processor to cause the apparatus to:
determine, according to the priority level associated with each sidelink feedback message, that no sidelink feedback message at least partially overlaps with a previously mapped sidelink feedback message having a higher priority level; and
include, according to the gap threshold, each sidelink feedback message in the first subset of sidelink feedback messages or the second subset of sidelink feedback messages.

19. The apparatus of claim 15, wherein the instructions are further executable by the processor to cause the apparatus to:
determine that a number of sidelink feedback messages in the first subset of sidelink feedback messages satisfy a maximum sidelink feedback message count associated with the UE, wherein the mapping is based at least in part on the number of sidelink feedback messages satisfying the maximum sidelink feedback message count.

20. The apparatus of claim 15, wherein the instructions to mapping the first subset of sidelink feedback messages to the first set of frequency domain resources and the second subset of sidelink feedback messages to the second set of frequency domain resources are further executable by the processor to cause the apparatus to:
identify a first sidelink feedback channel on a first resource and a second sidelink feedback channel on a second resource, wherein the set of gap frequency resources between the first resource and the second resource fails to satisfy the gap threshold, the first sidelink feedback channel having a different direction and a lower priority level than the second sidelink feedback channel; and
drop the first sidelink feedback channel based at least in part on the failing to satisfy the gap threshold and the priority level.

21. The apparatus of claim 14, wherein the instructions are further executable by the processor to cause the apparatus to:
determine that each sidelink feedback message in the first subset of sidelink feedback messages and the second subset of sidelink feedback messages is non-overlapping with one or more instances of a set of gap frequency resources, wherein transmitting the first subset of sidelink feedback messages while concurrently receiving the second subset of sidelink feedback messages is based at least in part on the non-overlapping.

22. The apparatus of claim 21, wherein the set of gap frequency resources are not configured between two or more instances of the first subset of sidelink feedback messages or between two or more instances of the second subset of sidelink feedback messages.

23. The apparatus of claim 14, wherein the instructions are further executable by the processor to cause the apparatus to:
determine that a sidelink feedback message reception in the second set of sidelink feedback messages is in between two sidelink feedback message transmissions in the second set of sidelink feedback messages, wherein transmitting the first subset of sidelink feedback messages while concurrently receiving the second subset of sidelink feedback messages further comprises dropping at least one of the two sidelink feedback message transmissions based at least in part on the sidelink feedback message reception being in between the two sidelink feedback message transmissions and the priority level of each sidelink feedback message.

24. The apparatus of claim 14, wherein the instructions are further executable by the processor to cause the apparatus to:

determine that a sidelink feedback message reception in the second set of sidelink feedback messages is in between two sidelink feedback message transmissions in the second set of sidelink feedback messages, wherein transmitting the first subset of sidelink feedback messages while concurrently receiving the second subset of sidelink feedback messages further comprises dropping the sidelink feedback message reception based at least in part on the sidelink feedback message reception being in between the two sidelink feedback message transmissions and the priority level of each sidelink feedback message.

25. The apparatus of claim 14, wherein transmitting the first subset of sidelink feedback messages while concurrently receiving the second subset of sidelink feedback messages is performed while operating in a sub-band full duplex mode.

26. The apparatus of claim 14, wherein the instructions are further executable by the processor to cause the apparatus to:

identify one or more sidelink feedback messages that were dropped from the first set of sidelink feedback messages, the second set of sidelink feedback messages, or both; and schedule the one or more sidelink feedback messages separately from transmitting the first subset of sidelink feedback messages using the first set of frequency domain resources while concurrently receiving the second subset of sidelink feedback messages using the second set of frequency domain resources.

27. An apparatus for wireless communication at a user equipment (UE), comprising:

means for identifying a first set of sidelink feedback messages to transmit and a second set of sidelink feedback messages to receive, the first set of sidelink feedback messages scheduled to be transmitted concurrently with the second set of sidelink feedback messages; and means for selecting a first subset of sidelink feedback messages from the first set of sidelink feedback messages to transmit and a second subset of sidelink feedback messages from the second set of sidelink feedback messages to receive based at least in part on a priority level associated with each sidelink feedback message and a first set of frequency domain resources for the first subset of sidelink feedback messages and a second set of frequency domain resources for the second subset of sidelink feedback messages.

28. The apparatus of claim 27, further comprising:

means for mapping the first set of sidelink feedback messages to the first set of frequency domain resources and the second set of sidelink feedback messages to a second subset of frequency domain resources based at least in part on the priority level of each sidelink feedback message and a set of gap frequency resources configured between the first set of frequency domain resources and the second set of frequency domain resources satisfying a gap threshold; and means for transmitting, in accordance with the mapping, the first subset of sidelink feedback messages using the first set of frequency domain resources while concurrently receiving the second subset of sidelink feedback messages using the second set of frequency domain resources.

29. A non-transitory computer-readable medium storing code for wireless communication at a user equipment (UE), the code comprising instructions executable by a processor to:

identify a first set of sidelink feedback messages to transmit and a second set of sidelink feedback messages to receive, the first set of sidelink feedback messages scheduled to be transmitted concurrently with the second set of sidelink feedback messages; and select a first subset of sidelink feedback messages from the first set of sidelink feedback messages to transmit and a second subset of sidelink feedback messages from the second set of sidelink feedback messages to receive based at least in part on a priority level associated with each sidelink feedback message and a first set of frequency domain resources for the first subset of sidelink feedback messages and a second set of frequency domain resources for the second subset of sidelink feedback messages.

30. The non-transitory computer-readable medium of claim 29, wherein the instructions are further executable by the processor to:

map the first set of sidelink feedback messages to the first set of frequency domain resources and the second set of sidelink feedback messages to a second subset of frequency domain resources based at least in part on the priority level of each sidelink feedback message and a set of gap frequency resources configured between the first set of frequency domain resources and the second set of frequency domain resources satisfying a gap threshold; and transmit, in accordance with the mapping, the first subset of sidelink feedback messages using the first set of frequency domain resources while concurrently receiving the second subset of sidelink feedback messages using the second set of frequency domain resources.

* * * * *